(12) United States Patent
Kubota et al.

(10) Patent No.: US 11,960,004 B2
(45) Date of Patent: Apr. 16, 2024

(54) LIGHT DETECTOR AND DISTANCE MEASURING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hiroshi Kubota, Tokyo (JP); Nobu Matsumoto, Ebina Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 809 days.

(21) Appl. No.: 17/016,991

(22) Filed: Sep. 10, 2020

(65) Prior Publication Data

US 2021/0293957 A1    Sep. 23, 2021

(30) Foreign Application Priority Data

Mar. 17, 2020  (JP) ................................. 2020-046076

(51) Int. Cl.
   *G01S 17/10*  (2020.01)
   *G01S 7/481*  (2006.01)

(52) U.S. Cl.
   CPC ............ *G01S 17/10* (2013.01); *G01S 7/4814* (2013.01); *G01S 7/4816* (2013.01); *G01S 7/4817* (2013.01)

(58) Field of Classification Search
   CPC ........ G01S 17/10; G01S 17/42; G01S 7/4814; G01S 7/4816; G01S 7/4817; G01S 7/4863
   See application file for complete search history.

(56) References Cited

U.S. PATENT DOCUMENTS

| | | | |
|---|---|---|---|
| 2012/0249998 A1 | 10/2012 | Eisele et al. | |
| 2014/0078491 A1* | 3/2014 | Eisele | G01S 7/4863 |
| | | | 356/4.07 |
| 2017/0176575 A1* | 6/2017 | Smits | G01S 7/4808 |
| 2019/0004156 A1* | 1/2019 | Niclass | G01S 7/4863 |
| 2020/0300985 A1 | 9/2020 | Kubota et al. | |

FOREIGN PATENT DOCUMENTS

| | | |
|---|---|---|
| JP | H07-98429 A | 4/1995 |
| JP | 2002-350130 A | 12/2002 |
| JP | 4991787 B2 | 8/2012 |
| JP | 2020-153746 A | 9/2020 |

* cited by examiner

*Primary Examiner* — Luke D Ratcliffe

(74) *Attorney, Agent, or Firm* — Kim & Stewart LLP

(57) ABSTRACT

A light detector according to an embodiment includes a light receiver and a controller. The light receiver includes sensors and pixels. The sensors are arranged two-dimensionally on a substrate. The controller is configured to set a light-receiving region in which the sensors are selectively turned on in the light receiver. The controller sets first and second light-receiving regions. The first and second light-receiving regions include first and second pixel, respectively. The second light-receiving region is arranged away from an optical axis of laser light received by the light receiver. The controller, after turning on each of the first pixel and the second pixel, is further configured to turn off the second pixel in a state in which the first pixel is turned on.

19 Claims, 12 Drawing Sheets

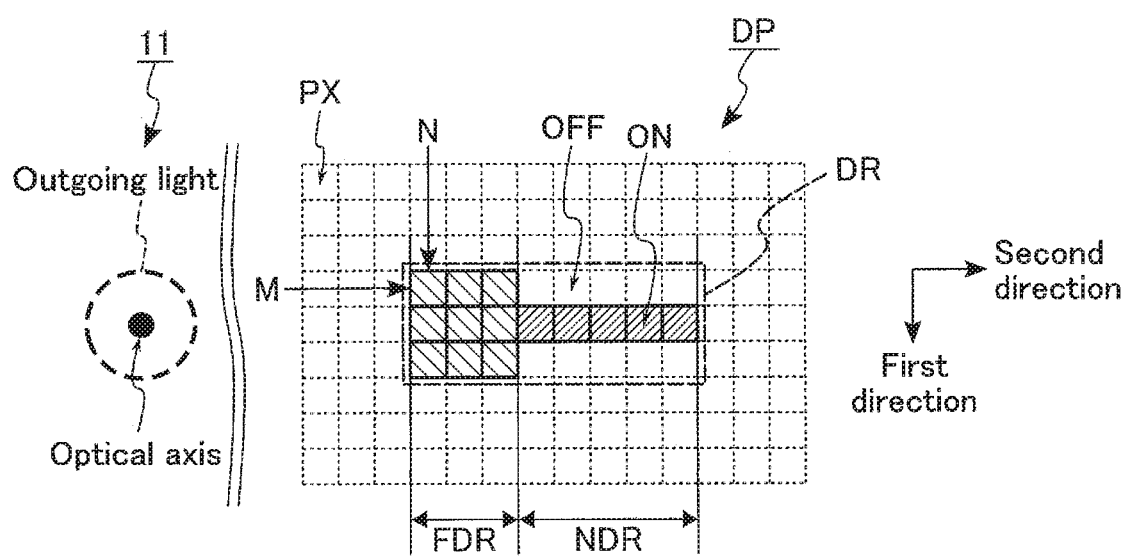
F I G. 11

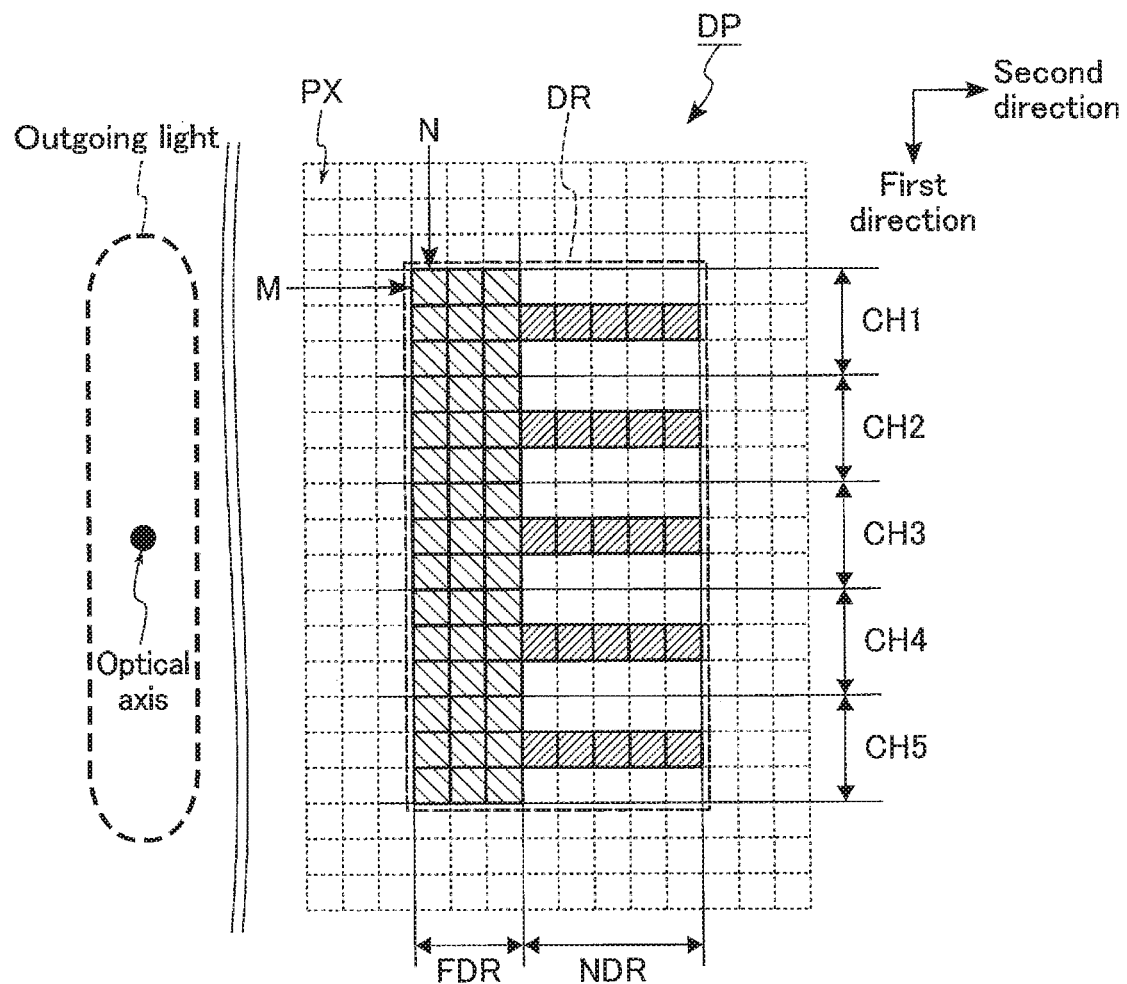
F I G. 16

_US 11,960,004 B2_

LIGHT DETECTOR AND DISTANCE MEASURING DEVICE

CROSS-REFERENCE TO RELATED APPLICATIONS

This application is based upon and claims the benefit of priority from Japanese Patent Application No. 2020-046076, filed Mar. 17, 2020, the entire contents of which are incorporated herein by reference.

FIELD

Embodiments described herein relate generally to a light detector and a distance measuring device.

BACKGROUND

A distance measuring device called "LiDAR (Light Detection and Ranging)" is known. A LiDAR irradiates a target object with laser light, and detects the intensity of reflected light reflected from the target object by a sensor (light detector). Then, the LiDAR measures a distance from itself to the target object based on a time change of a light intensity signal output from the sensor. There are a number of sensors used in the LiDAR, but a two-dimensional sensor (2D sensor) comprising a plurality of silicon photomultipliers arranged two-dimensionally is known as a promising sensor in the future.

BRIEF DESCRIPTION OF THE DRAWINGS

FIG. 11 depicts a plan view showing an example of a setting method of a light-receiving region of the light detector in a distance measurement operation of the distance measuring device according to the first embodiment.

FIG. 16 depicts a plan view showing an example of a setting method of a light-receiving region of a light detector in a distance measurement operation of a distance measuring device according to a fourth embodiment.

DETAILED DESCRIPTION

In general, according to one embodiment, a light detector according to an embodiment includes a light receiver and a controller. The light receiver includes sensors and pixels. The sensors are arranged two-dimensionally on a substrate. Each of the pixels includes at least one of the sensors. The controller is configured to set a light-receiving region in which the sensors are selectively turned on in the light receiver. The controller sets first and second light-receiving regions based on information on coordinates input from outside. The first light-receiving region includes a first pixel included in the pixels. The second light-receiving region includes a second pixel included in the pixels. The second light-receiving region is arranged away from an optical axis of laser light received by the light receiver, with the first light-receiving region as a reference. The controller, after turning on each of the first pixel and the second pixel, is further configured to turn off the second pixel in a state in which the first pixel is turned on.

Embodiments will be described below with reference to the accompanying drawings. Each embodiment exemplifies a device and a method for embodying a technical idea of the invention. The drawings are schematic or conceptual, and the dimensions and ratios, etc. of each drawing are not necessarily the same as those of the actual implementation. The technical idea of the present invention is not restricted by the shapes, structures, arrangements, etc., of the structural elements. In the following descriptions, structural elements having substantially the same function and configuration will be denoted by the same reference symbol. The numbers after the letters constituting the reference symbols are used to discriminate between elements that are denoted by the reference symbols sharing letters in common and that have similar configurations.

[1] First Embodiment

A distance measuring device 1 according to a first embodiment is a type of LiDAR (Light Detection and Ranging) capable of measuring a distance between the distance measuring device 1 and a target object. The distance measuring device 1 according to the first embodiment will be described below. Note that "target object TG" in the present specification refers to an object included in a range in which the distance measuring device 1 measures distance.

[1-1] Configuration

[1-1-1] Configuration of Distance Measuring Device 1

Figure 1:
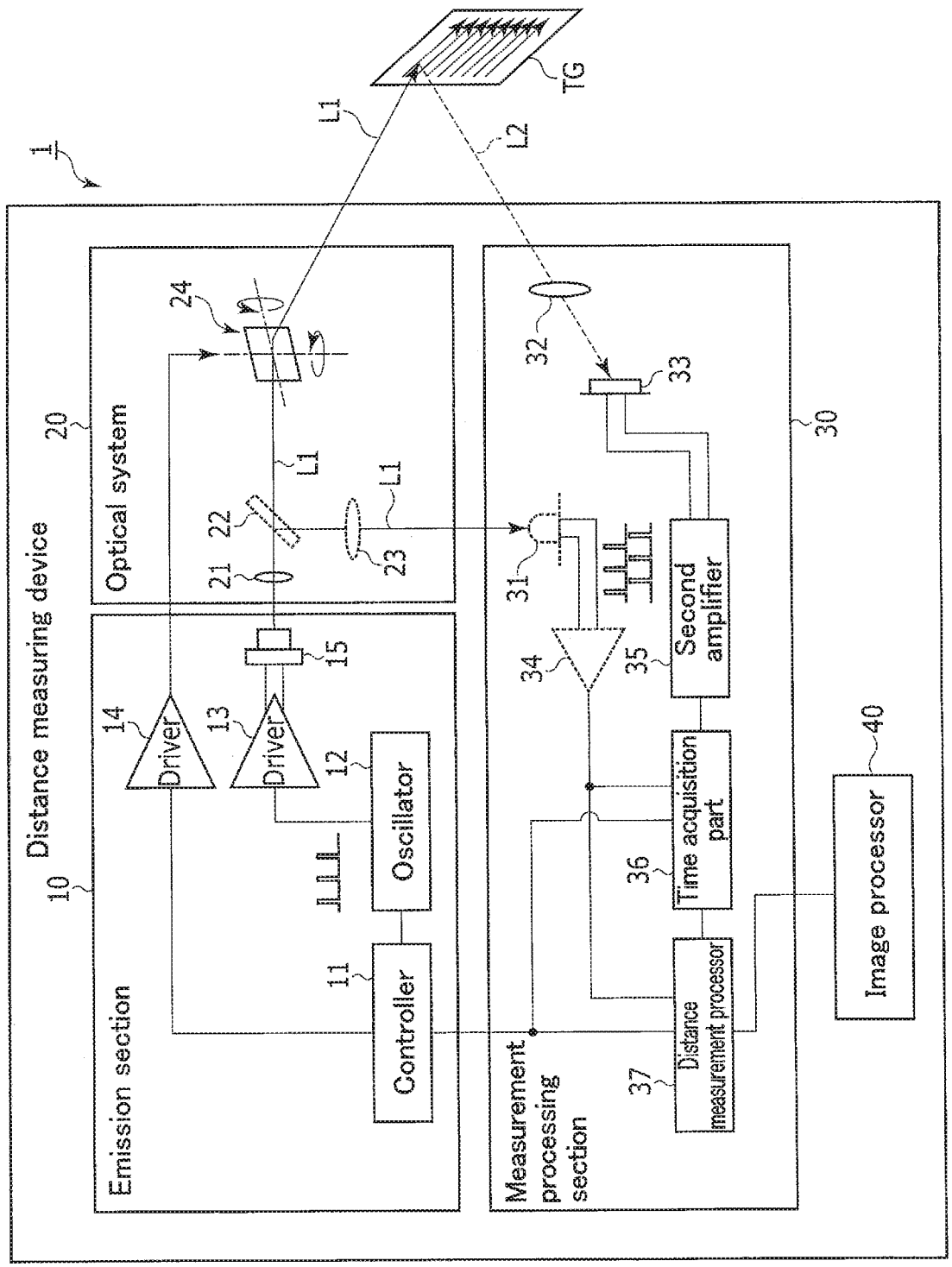
FIG. 1 depicts a schematic diagram showing an example of an overall configuration of a distance measuring device according to a first embodiment.

FIG. 1 depicts an example of an overall configuration of the distance measuring device 1 according to the first embodiment. As shown in FIG. 1, the distance measuring device 1 according to the first embodiment includes, for example, an emission section 10, an optical system 20, a measurement processing section 30, and an image processor 40.

The emission section 10 generates and emits laser light for use by the distance measuring device 1 to measure a distance between itself and the target object TG. The emission section 10 includes, for example, a controller 11, an oscillator 12, a first driver 13, a second driver 14, and a light source 15. Note that the controller 11 may be divided into an emission controller for controlling the emission section and a light-receiving controller for the measurement processing section (light-receiving section). If this is the case, the emission controller is included in the emission section 10, and the light-receiving controller is included in the measurement processing section (light-receiving section) 30.

The controller 11 controls an overall operation of the distance measuring device 1. The controller 11 includes, for example, a central processing unit (CPU), a read only memory (ROM), a random access memory (RAM), etc. The ROM in the controller 11, for example, stores a program used for an operation of the distance measuring device 1. The CPU of the controller 11 controls, for example, the oscillator 12, and the first driver 13 and second driver 14, according to the program stored in the ROM.

The oscillator 12 generates a pulse signal based on control by the controller 11. Then, the oscillator 12 outputs the generated pulse signal to the first driver 13. A timing at which the pulse signal rises corresponds to a timing at which the emission section 10 emits laser light.

The first driver 13 generates a drive current according to the pulse signal input from the oscillator 12, and supplies the generated drive current to the light source 15. That is, the first driver 13 functions as a current supply source of the light source 15.

The second driver 14 generates a drive current according to control by the controller 11, and supplies the generated drive current to a mirror 24 of the optical system 20. That is, the second driver 14 functions as a power supply circuit of the mirror 24.

The light source 15 is a laser light source, such as a laser diode. The light source 15 emits laser light L1 intermittently based on the drive current supplied from the first driver 13. The laser light L1 is applied to the target object TG through the optical system 20 to be described later.

The optical system 20 splits the incident laser light L1 in two. Then, the optical system 20 emits one of the laser light L1 split in two to the target object TG, and emits the other one to the light detector 31 of the measurement processing section 30. The optical system 20 includes, for example, a lens 21, an optical element 22, a lens 23, and the mirror 24.

The lens 21 is arranged on an optical path of the laser light L1 emitted from the light source 15. The lens 21 collimates the laser light L1 passing through itself, and guides the collimated laser light L1 to the optical element 22.

The optical element 22 splits the laser light L1 guided by the lens 21 in two. The beams of the laser light L1 split in two are respectively emitted toward the lens 23 and mirror 24. The optical element 22 is, for example, a beam splitter.

The lens 23 is arranged on an optical path of one of the laser light L1 split by the optical element 22. The lens 23 collects the laser light L1 passing through the lens 23, and guides the collected laser light L1 to the light detector 31 of the measurement processing section 30. That is, the lens 23 collects part of the laser light L1 before being emitted outside by the distance measuring device 1, in the light detector 31.

The mirror 24 reflects the laser light L1 incident thereon. The mirror 24 is driven based on the drive current supplied from the second driver 14. For example, a reflecting surface of the mirror 24 is formed to be rotatable around one axis, or two axes intersecting each other. The laser light L1 reflected from the mirror 24 is emitted to the target object TG outside the distance measuring device 1.

The measurement processing section 30 measures a distance between the distance measuring device 1 and the target object TG based on the laser light L1 guided from the optical system 20 and laser light L2 reflected from the target object TG. The measurement processing section 30 includes, for example, the light detector 31, a lens 32, a light detector 33, a first amplifier 34, a second amplifier 35, a time acquisition part 36, and a distance measurement processor 37.

The light detector 31 receives the laser light L1 incident thereon through the lens 23. Then, the light detector 31 outputs an electric signal based on the light intensity of the received laser light L1 to the first amplifier 34. The light detector 31 is, for example, a photodiode.

The lens 32 collects the reflected light L2 reflected from the target object TG, and guides the collected reflected light L2 to the light detector 33. That is, the lens 32 collects the outside light including the laser light L2 applied to the distance measuring device 1, in the light detector 33.

The light detector 33 receives the reflected light L2 incident thereon through the lens 32. Then, the light detector 33 outputs an electric signal based on the light intensity of the received reflected light L2 to the second amplifier 35. The light detector 33 may include a photomultiplier element using a semiconductor. Details of the light detector 33 will be described later.

The first amplifier 34 amplifies the electric signal input from the light detector 31, and outputs the amplified electric signal to, for example, each of the time acquisition part 36 and the distance measurement processor 37. Hereinafter, the electric signal output by the first amplifier 34 may be referred to as a reference signal.

The second amplifier 35 amplifies the electric signal input from the light detector 33, and outputs the amplified electric signal to, for example, each of the time acquisition part 36 and the distance measurement processor 37. The second amplifier 35 is, for example, a transimpedance amplifier. Hereinafter, the electric signal output by the second amplifier 35 may be referred to as a measurement signal.

The time acquisition part 36 acquires a first time corresponding to a timing at which the emission section 10 emits the laser light L1 based on the signal strength of the reference signal input from the first amplifier 34. In addition, the time acquisition part 36 acquires a second time at which the light detector 33 receives the laser light L2 reflected from the target object TG based on the signal strength of the measurement signal input from the second amplifier 35. Note that a set of the first time and second time is acquired for each reference signal intermittently emitted. The time acquisition part 36 may decide each time based on a rise time of a reference signal or measurement signal, or based on a peak time of a reference signal or measurement signal.

The distance measurement processor 37 measures, for example, a distance between the distance measuring device 1 and the target object TG based on a time difference between the first time and the second time acquired by the time acquisition part 36. That is, the distance measurement processor 37 calculates times of flight of the laser lights L1 and L2 based on an emission timing of the laser light L1 by the emission section 10 and an incident timing of the laser light L2 reflected from the target object TG to the light detector 33. Then, the distance measurement processor 37 measures the distance between the distance measuring device 1 and the target object TG based on the times of flight and the speed of the laser lights. Such a distance measuring method may be called "ToF (Time of Flight) method".

The image processor 40 acquires a measurement result of the distance between the distance measuring device 1 and the target object TG measured by the distance measurement processor 37. Then, the image processor 40 uses a plurality of acquired measurement results to generate images including distance information in a measurement-target region of the distance measuring device 1. The generated image is, for example, referred to by a control program of a vehicle, etc. equipped with the distance measuring device 1.

As described above, the distance measuring device 1 according to the first embodiment has a non-coaxial optical system in which the optical axis of the laser light L1 emitted from the emission section 10 and that of the laser light L2 received by the light detector 33 are different. The configuration of the distance measuring device 1 according to the first embodiment is not limited to the above-described configuration. The configuration of the distance measuring device 1 according to the first embodiment may be other configurations as long as operations to be described later are executable.

For example, the optical element 22, lens 23, light detector 31, and first amplifier 34 may be omitted. If this is the case, instead of these configurations, the oscillator 12 may output a reference signal to the measurement processing section 30. In addition, the processing by the image processor 40 may be executed by an external device connected to the distance measuring device 1.

[1-1-2] Configuration of Light Detector 33

Figure 2:
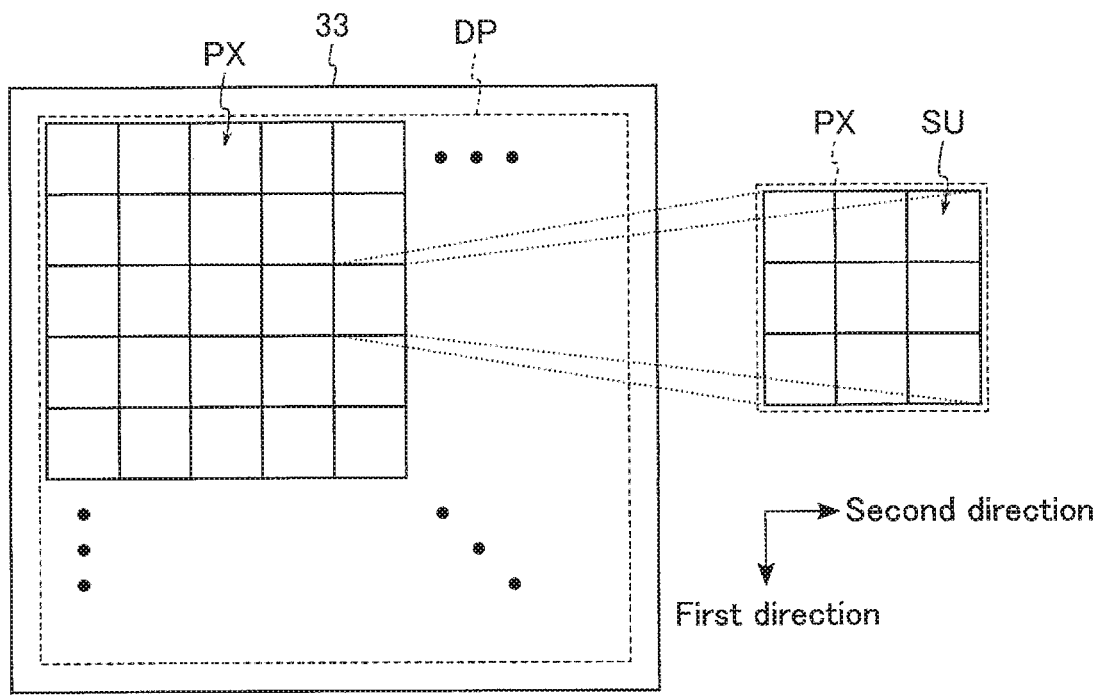
FIG. 2 depicts a plan view showing an example of a planar layout of a light detector according to the first embodiment.

FIG. 2 depicts an example of a planar layout of the light detector 33 according to the first embodiment. As shown in FIG. 2, the light detector 33 includes a light receiver DP. In the drawings to be referred to below, "first direction" and "second direction" correspond to directions intersecting each other.

The light receiver DP is, for example, a region for the light detector 33 to receive the laser light L2 reflected from the target object TG. The light detector 33 includes a plurality of pixels PX in the light receiver DP. The plurality of pixels PX are arranged, for example, in a matrix expanding in the first and second directions on a semiconductor substrate. In other words, the plurality of pixels PX are arranged two-dimensionally.

Each of the plurality of pixels includes at least one photomultiplier element. As a photomultiplier element, for example, a single-photon avalanche diode is used. Hereinafter, a single-photon avalanche diode is referred to as a "SPAD", and a circuit for using the SPAD is referred to as a "SPAD unit SU". Functions of the SPAD will be described in detail later. In a case where a plurality of SPAD units SU are provided in a pixel PX, the plurality of SPAD units SU are arranged, for example, in a matrix expanding in the first and second directions. A pixel PX including a plurality of SPAD units SU may be called a "silicon photomultiplier (SiPM)".

Note that the number of each of the pixels PX and SPAD units SU included in the light detector 33 is not limited to the number shown in FIG. 2, and can be freely designed. The planar shape of each of the pixels PX and SPAD units SU may not necessarily be a square. The shape of the pixel PX can vary according to the shape and arrangement of the SPAD units SU included in each pixel PX. For example, in each pixel PX, the number of SPAD units SU arranged in the first direction and the number of SPAD units SU arranged in the second direction may be different. The light detector 33 may use pixels PX having different shapes. The SPAD units SU may have other shapes, e.g., rectangles.

(Circuit Configuration of SPAD Unit SU)

Figure 3:
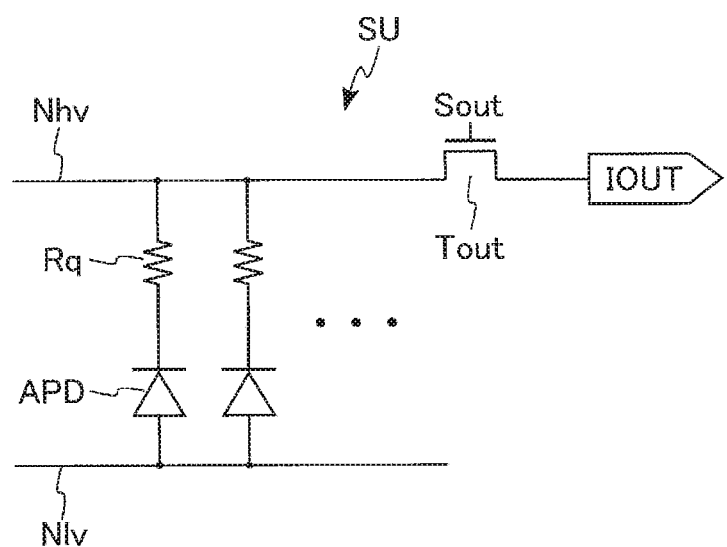
FIG. 3 depicts a circuit diagram showing an example of a circuit configuration of a SPAD unit included in the light detector according to the first embodiment.

FIG. 3 depicts an example of a circuit configuration of the SPAD unit SU included in the light detector 33 according to the first embodiment. As shown in FIG. 3, the SPAD unit SU includes, for example, an avalanche photodiode APD and a quench resistor Rq.

The avalanche photodiode APD and quench resistor Rq are coupled in series between a high voltage node Nhv and a low voltage power supply node Nlv. Specifically, an anode of the avalanche photodiode APD is coupled to the low voltage power supply node Nlv. A cathode of the avalanche photodiode APD is coupled to one end of the quench resistor Rq. The other end of the quench resistor Rq is coupled to the high voltage node Nhv.

In the distance measurement operation of the distance measuring device 1, an electric voltage of the high voltage node Nhv is higher than a voltage applied to the low voltage power supply node Nlv. That is, in the distance measurement operation, a reverse bias is applied to the avalanche photodiode APD. The high voltage node Nhv corresponds to an output end of a light detection result by the avalanche photodiode APD included in the SPAD, i.e., an output node. A transistor Tout is coupled to the high voltage node Nhv. A control signal Sout is input to the gate of the transistor Tout.

The SPAD unit SU outputs an output signal IOUT corresponding to a light detection result through the transistor Tout coupled to the high voltage node Nhv. For example, if the control signal Sout is at a level "H", the SPAD unit SU outputs the output signal IOUT based on a voltage of the high voltage node Nhv through the transistor Tout. If the control signal Sout is at a level "L", the output of the output signal IOUT by the SPAD unit SU is cut off by the transistor Tout. In reality, the transistor Tout is formed by a plurality of transistors coupled in multiple stages.

In the distance measuring device 1, for example, the control signal Sout can be independently controlled for each pixel PX. That is, the distance measuring device 1 can bring the SPAD units SU included in each pixel PX into an active state or an inactive state as necessary. In the present specification, "SPAD unit SU in an active state" indicates that the SPAD unit SU is in a state capable of detecting an optical signal and outputting an output signal IOUT. "SPAD in an inactive state" indicates that the SPAD unit SU is in a state not outputting an output signal IOUT based on a received optical signal. Hereinafter, a pixel PX including a SPAD unit SU in an active state is referred to as a pixel PX in an ON state. A pixel PX including a SPAD unit SU in an inactive state is referred to as a pixel PX in an OFF state.

The circuit configuration of the pixel PX is not limited to the configuration described above. For example, the quench resistor Rq may be replaced with a transistor. A transistor used for quenching may be further coupled to the high voltage node Nhv. The transistor Tout may be an N-type transistor or a P-type transistor. The transistor Tout may be other switch elements as long as they are capable of selectively outputting the output signal IOUT. The arrangement of the high voltage node Nhv (output node) may be other arrangements as long as they are capable of outputting a light detection result by the avalanche photodiode APD. In addition, a plurality of SPAD units SU may form a group. If this is the case, the output signal IOUT corresponds to, for example, an electric signal corresponding to a total sum of outputs of the SPAD units SU belonging to the group.

(Operation Principle of SPAD)

Figure 4:
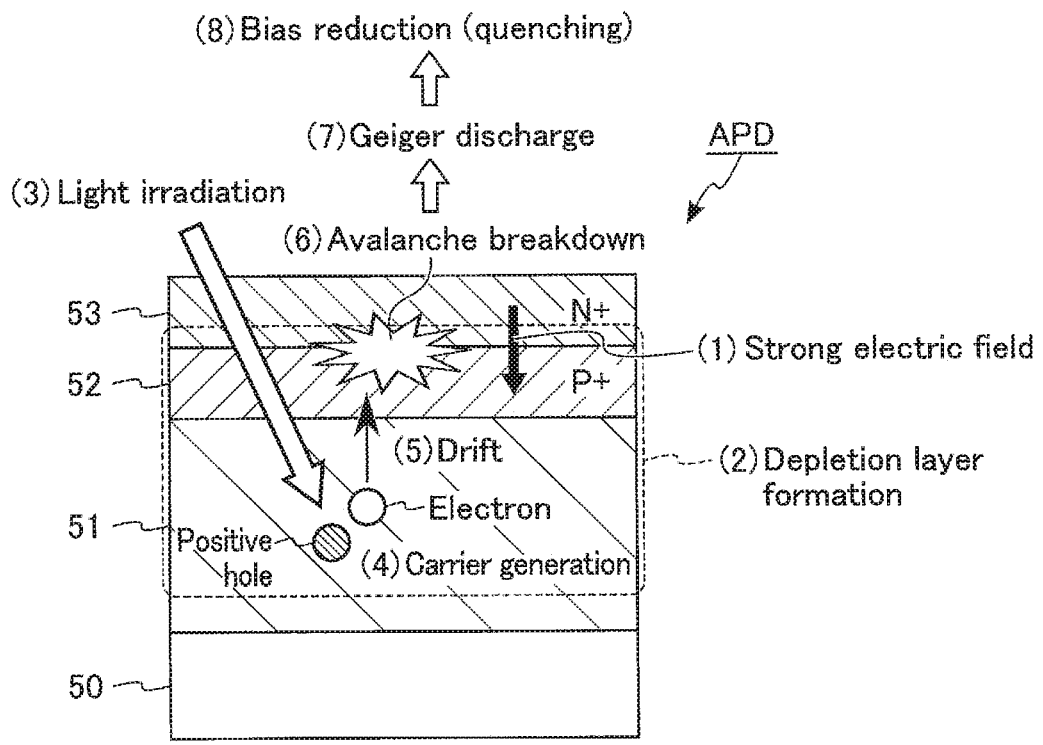
FIG. 4 depicts a schematic diagram showing an example of a structure of an avalanche photodiode and an operation principle of the SPAD.

Hereinafter, an example of a configuration of the avalanche photodiode APD and an operation principle of the SPAD are described with reference to FIG. 4. FIG. 4 depicts an outline of an example of a configuration of the avalanche photodiode APD and an operation principle of the SPAD.

First, the configuration of the avalanche photodiode APD will be described. The avalanche photodiode APD includes, for example, a substrate 50, a P-type semiconductor layer 51, a P$^+$-type semiconductor layer 52, and an N$^+$-type semiconductor layer 53.

The substrate 50 is, for example, a P-type semiconductor substrate. On the substrate 50, the P-type semiconductor layer 51, P$^+$-type semiconductor layer 52, and N$^+$-type semiconductor layer 53 are stacked in this order. The concentration of P-type impurities in the P$^+$-type semiconductor layer 52 is higher than that of P-type impurities in the P-type semiconductor layer 51. The N$^+$-type semiconductor layer 53 is a semiconductor layer doped with N-type impurities. For example, on the N$^+$-type semiconductor layer 53, an electrode (not shown) is coupled.

Now, the operation principle of the SPAD will be described. In the distance measuring device 1 according to the first embodiment, the substrate 50 side corresponds to the low voltage node Nlv, and the N$^+$-type semiconductor layer 53 corresponds to the high voltage side (cathode).

In the distance measurement operation of the distance measuring device 1, a high negative voltage is applied to the substrate 50 side of the avalanche photodiode APD. That is, a high reverse bias is applied to the avalanche photodiode APD, and a strong electric field is generated between the P$^+$-type semiconductor layer 52 and the N$^+$-type semiconductor layer 53 (FIG. 4 (1)). Accordingly, a depletion layer is formed in the vicinity of a junction (i.e., PN junction) area between the P$^+$-type semiconductor layer 52 and N$^+$-type semiconductor layer 53 (FIG. 4 (2)) In the distance measurement operation, the avalanche photodiode APD in this state corresponds to a state capable of detecting an optical signal.

Then, when the avalanche photodiode APD is irradiated with light, part of energy of the light reaches the depletion layer (FIG. 4 (3)). When the depletion layer is irradiated with light, a pair of an electron and a positive hole, i.e., a carrier, may be generated in the depletion layer (FIG. 4 (4)). The carrier generated in the depletion layer drifts due to an electric field of a reverse bias applied to the avalanche photodiode APD (FIG. 4 (5)). For example, the positive hole in the generated carrier is accelerated toward the substrate 50 side. On the other hand, the electron in the generated carrier is accelerated toward the N$^+$-type semiconductor layer 53 side.

The electron accelerated toward the N$^+$-type semiconductor layer 53 side collides with an atom under a strong electric field generated in the vicinity of the PN junction. As a result, the electron that collided with the atom ionizes the atom, and generates a new pair of an electron and a positive hole. If a voltage of the reverse bias applied to the avalanche photodiode APD exceeds a breakdown voltage of the avalanche photodiode APD, such generation of a pair of an electron and a positive hole is repeated. Such a phenomenon is referred to as an avalanche breakdown (FIG. 4 (6)).

When an avalanche breakdown occurs, the avalanche photodiode APD discharges an electric current (FIG. 4 (7)). Such a discharge is referred to as a Geiger discharge. When the Geiger discharge occurs, an electric current flows through the output node of the SPAD unit SU. Thereby, an electric signal related to the Geiger discharge and the subsequent recovery is output from the avalanche photodiode APD, i.e., one SPAD.

In addition, the electric current output from the avalanche photodiode APD, for example, flows in the quench resistor Rq. As a result, a voltage drop occurs in the output node of the SPAD unit SU (FIG. 4 (8)). Such a voltage drop in the SPAD unit SU is referred to as quenching. When the voltage of the reverse bias applied to the avalanche photodiode APD drops below the breakdown voltage due to the voltage drop, the Geiger discharge is stopped. After that, when charging of the capacity at the PN junction of the avalanche photodiode APD and flowing of the recovery current are completed, the avalanche photodiode APD stops outputting the electric current. Some time after the Geiger discharge is stopped, the avalanche photodiode APD returns to a state capable of detecting the next light beam.

As described above, the light detector 33 included in the distance measuring device 1 according to the first embodiment has the avalanche photodiode APD used in a Geiger mode. Then, the avalanche photodiode APD generates an avalanche breakdown according to light incidence, and outputs an electric signal corresponding to a light detection result. Thereby, the light detector 33 can detect received light in photon units, and convert the light into an electric signal.

The structure of the avalanche photodiode APD used in the SPAD unit SU is not limited to the above-described structure. For example, the P$^+$-type semiconductor layer 52 may be omitted. The thickness of each of the P-type semiconductor layer 51, P$^+$-type semiconductor layer 52, and N$^+$-type semiconductor layer 53 can be changed as appropriate. The PN junction of the avalanche photodiode APD may be formed in the vicinity of the boundary with the substrate 50. In the structure of the avalanche photodiode APD, the P-type semiconductor layer and N-type semiconductor layer may be formed in reverse.

(Setting of Light-Receiving Region DR)

The light detector 33 according to the first embodiment can set the light-receiving region DR by setting one or more pixels PX within a predetermined region included in the light receiver DP to an ON state. Hereinafter, an example of a method of setting the light-receiving region DR will be described.

It is assumed that a coordinate corresponding to the first direction and a coordinate corresponding to the second direction are assigned to each of a plurality of pixels provided in the light receiver DP. In the distance measurement operation of the distance measuring device 1, the entire light-receiving region DR may not necessarily be irradiated with light, and normally only a part thereof is irradiated.

Figure 5:
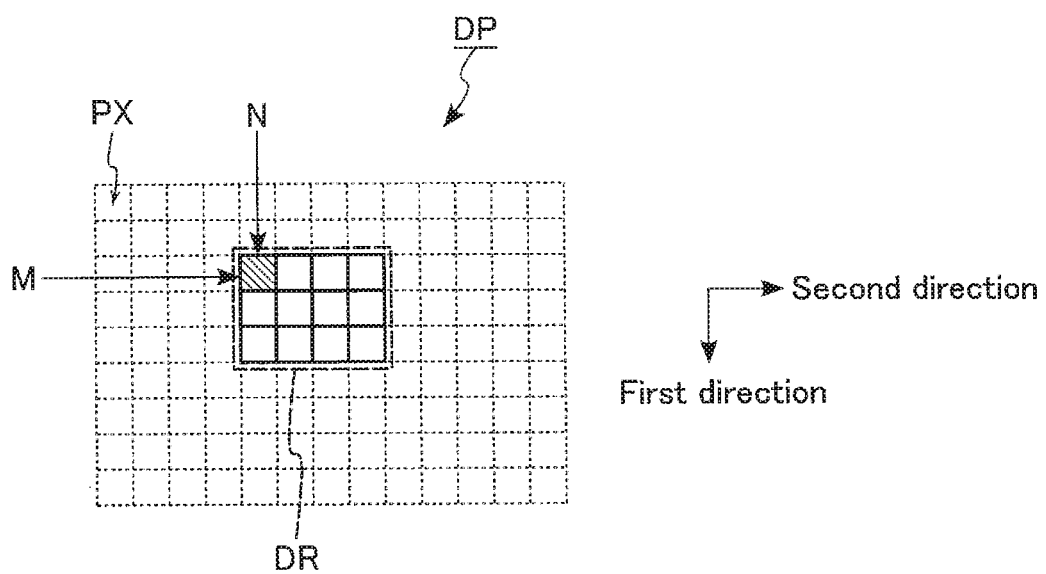
FIG. 5 depicts a plan view showing an example of a setting method of a light-receiving region in a light receiver included in the light detector according to the first embodiment.

FIG. 5 depicts an example of a method of setting the light-receiving region DR in the light receiver DP included in the light detector 33 according to the first embodiment. As shown in FIG. 5, the light detector 33 according to the first embodiment sets the light-receiving region DR based on coordinates "N" and "M". "N" corresponds to a coordinate in the first direction of a pixel PX. "M" corresponds to a coordinate in the second direction of a pixel PX. These coordinates associated with the light-receiving region DR are, for example, designated based on control by the controller 11 of the emission section 10 or a light-receiving controller.

In addition, the coordinates "N" and "M" correspond to, for example, coordinates of an upper-left pixel within the light-receiving region DR. The present invention is not limited thereto, and the light-receiving region DR may be at least set with addresses corresponding to the coordinates "N" and "M" as a reference. For example, the coordinates of a pixel PX designated by the coordinates "N" and "M" may correspond to coordinates of any pixel PX, such as a lower-left, upper-right, lower-right, or central pixel PX, within the light-receiving region DR.

Then, the light-receiving region DR is set to a region having an expanse three pixels by four pixels in the first direction and the second direction, respectively, with the coordinates "N" and "M" as a reference. In other words, in this example, the light-receiving region DR is set to a rectangular region including 3×4 pixels. The arrangement of the pixels PX set to an ON state within the light-receiving region DR can be set as appropriate. In addition, the pixels PX within the light receiver DP and not included in the light-receiving region DR are set to an OFF state.

At least one pixel PX within the light-receiving region DR may convert the received light to an electric signal, and output an output signal IOUT corresponding to the light intensity. The output signal IOUT generated by each pixel PX is output for each pixel PX. Thereby, only a signal of a pixel PX irradiated with light is used so that noise from a pixel PX not irradiated with light is canceled and an S/N ratio (signal-to-noise ratio) increases.

The position and shape of the above-described light-receiving region DR are set according to a scanning position of laser light emitted by the distance measuring device 1. Specifically, the controller 11 of the emission section 10 or the controller of the light receiving section 30 designates the coordinates "N" and "M" associated with an inclination of the mirror 24 at a timing of emitting the laser light, and instructs the light detector 33 to set the light-receiving region DR. Thereby, the distance measuring device 1 can set a pixel PX within a region estimated to be irradiated with the laser light L2 reflected from the target object TG to an ON state, and detect the laser light L2. Furthermore, the light detector 33 according to the first embodiment can set a plurality of types of light-receiving regions having different optimal measurement distances, within the light-receiving region DR. This operation will be described in detail later.

(Output Part of Light Detector 33)

The light detector 33 according to the first embodiment, for example, further has a configuration of performing, prior to transferring optical signals (output signals IOUT) acquired from a plurality of pixels PX within the light-receiving region DR to the second amplifier 35, predetermined signal processing for the output signals IOUT.

Figure 6:
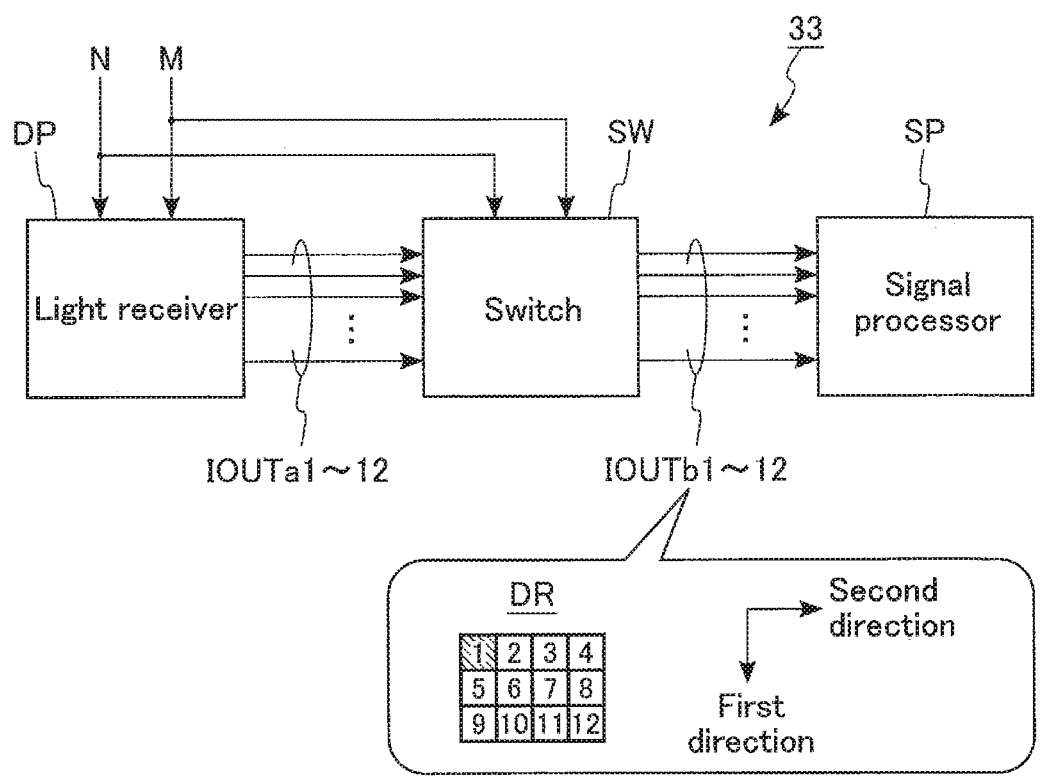
FIG. 6 depicts a block diagram showing an example of a configuration of an output part of the light detector according to the first embodiment.

FIG. 6 depicts an example of a configuration of an output part of the light detector 33 according to the first embodiment. In this example, it is assumed that a rectangular light-receiving region DR including 3×4 pixels is set. As shown in FIG. 6, the light receiver DP outputs, for example, output signals IOUTa1 to IOUTa12 respectively corresponding to twelve pixels PX. In addition, the light detector 33 further comprises, for example, a switch SW and a signal processor SP, as the output part.

The switch SW includes a plurality of switch circuits, and has a function of aligning the order of a plurality of output signals IOUT output by the light receiver DP. Specifically, to the switch SW, for example, the output signals IOUTa1 to IOUTa12 output from the light receiver DP and the coordinates "N" and "M" indicating the coordinates of the light-receiving region DR are input. Then, the switch SW aligns the output signals IOUTa1 to IOUTa12 that are input, by appropriately re-coupling a plurality of switch circuits based on the coordinates "N" and "M". After that, the switch SW outputs output signals IOUTb1 to IOUTb12 corresponding to the aligned output signals IOUTa1 to IOUTa12 to the signal processor SP. Thereby, the output order of each pixel PX within the light-receiving region DR is changed to a predetermined order (e.g., the order shown in the lower portion of FIG. 6).

The signal processor SP performs various signal processing using the output signals IOUTb1 to IOUTb12 that are input from the switch SW. The signal processor SP can include, for example, an analog circuit like an amplifier circuit, an analog-to-digital converter, a time-to-digital converter, and a logic circuit like an integrator. By the signal processing by the signal processor SP, for example, an electric signal corresponding to the light intensity for each pixel PX and an electric signal corresponding to the light intensity of a plurality of pixels PX that are grouped are generated. Then, each generated electric signal is, for example, output to the second amplifier 35 at a subsequent stage.

As described above, the output part of the light detector 33 can perform the signal processing without changing the order of relative positions within the light-receiving region DR. Such a configuration of the output part can reduce the number of signal lines used for output of the pixels PX. The switch SW and signal processor SP may be provided integrally. In addition, the second amplifier 35 connected to the light detector 33 in the first embodiment may be included in the signal processor SP.

[1-2] Operation

Hereinafter, the operation of the distance measuring device 1 according to the first embodiment will be described.

[1-2-1] Scanning Method

Figure 7:
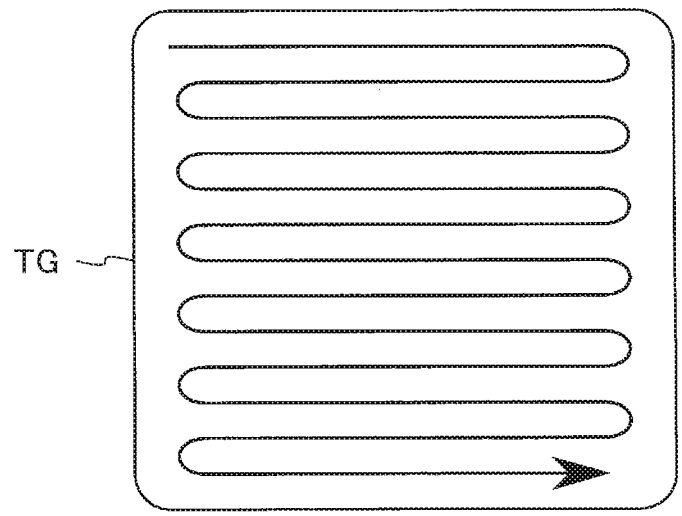
FIG. 7 depicts a schematic diagram showing an example of a scanning method of laser light in the distance measuring device according to the first embodiment.
Figure 8:
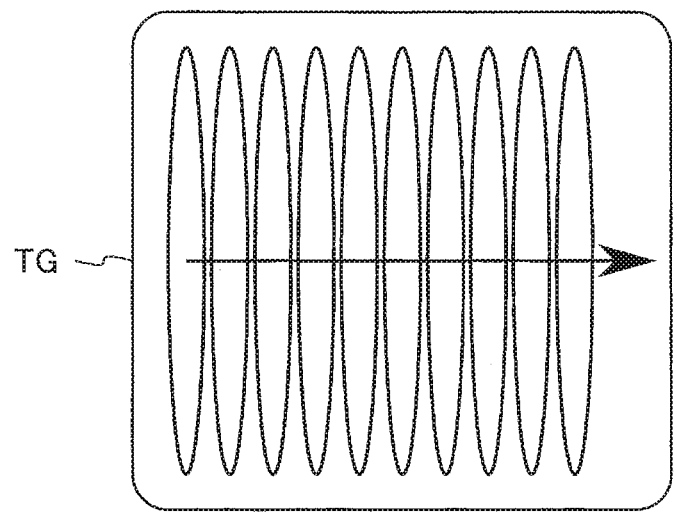
FIG. 8 depicts a schematic diagram showing an example of a scanning method of laser light in the distance measuring device according to the first embodiment.
Figure 9:
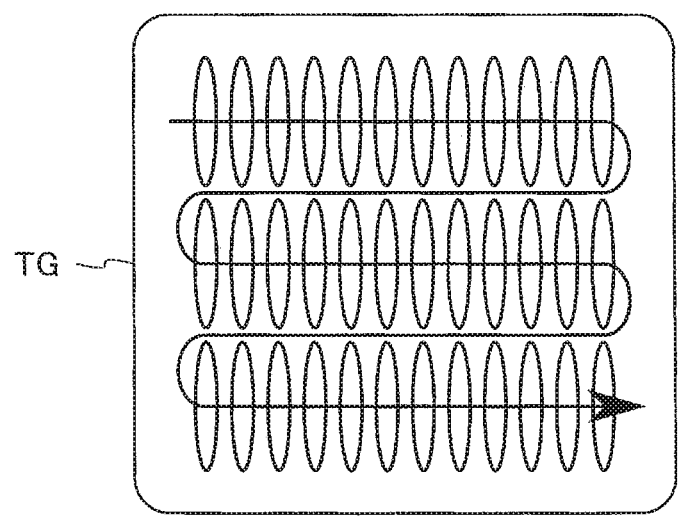
FIG. 9 depicts a schematic diagram showing an example of a scanning method of laser light in the distance measuring device according to the first embodiment.

First, an example of a scanning method of the laser light L1 in the distance measuring device 1 according to the first embodiment will be described. FIGS. 7 to 9 depict an example of an irradiation method of the laser light L1 to the target object TG, exemplifying mutually different scanning methods.

In an example shown in FIG. 7, the distance measuring device 1 scans in the right direction of the paper surface and then turns back to scan in the left direction, and scans in the left direction of the paper surface and then turns back again to scan in the right direction. The distance measuring device 1 repeatedly performs such scanning in the right and left directions. As a means for realizing such scanning, for example, it is conceivable to use a biaxial mirror.

In an example shown in FIG. 8, the distance measuring device 1 irradiates a plurality of pixels in a longitudinal line at the same time using a laser light source having an irradiation surface in a long and thin shape in the longitudinal direction, and/or an anisotropic aspherical collimator lens. As a means for realizing such scanning, for example, it is conceivable to use a revolving mirror or a single-axis mirror. In addition, the distance measuring device 1 itself may be rotated without using a mirror.

In an example shown in FIG. 9, the distance measuring device 1 irradiates a plurality of pixels in a vertical line at the same time using a laser light source having an irradiation surface in a long and thin shape in the vertical direction, and/or an anisotropic aspherical collimator lens, and repeatedly performs scanning shifted in the perpendicular direction multiple times. Examples of the means for realizing such scanning include a polygon mirror having different tilt angles, a revolving mirror, a biaxial mirror, etc.

The above-exemplified scanning methods are mechanical. As another scanning method, an OPA (Optical Phased Array) method is known. The effect provided by the distance measuring device 1 according to the first embodiment does not depend on a method of scanning light. Thus, the distance measuring device 1 according to the first embodiment may perform scanning of the laser light L1 using any one of the mechanical methods and the OPA method. Hereinafter, to simplify the description, a case where the distance measuring device 1 performs scanning of the laser light L1 using the method shown in FIG. 7 will be described.

[1-2-2] Parallax of Reflected Light

The distance measuring device 1 according to the first embodiment uses a non-coaxial optical system. Thus, in the light receiver DP, positional deviation, i.e., parallax, can occur between a position irradiated with reflected light from a short-distance target object TG and a position irradiated with reflected light from a long-distance target object TG.

Figure 10:
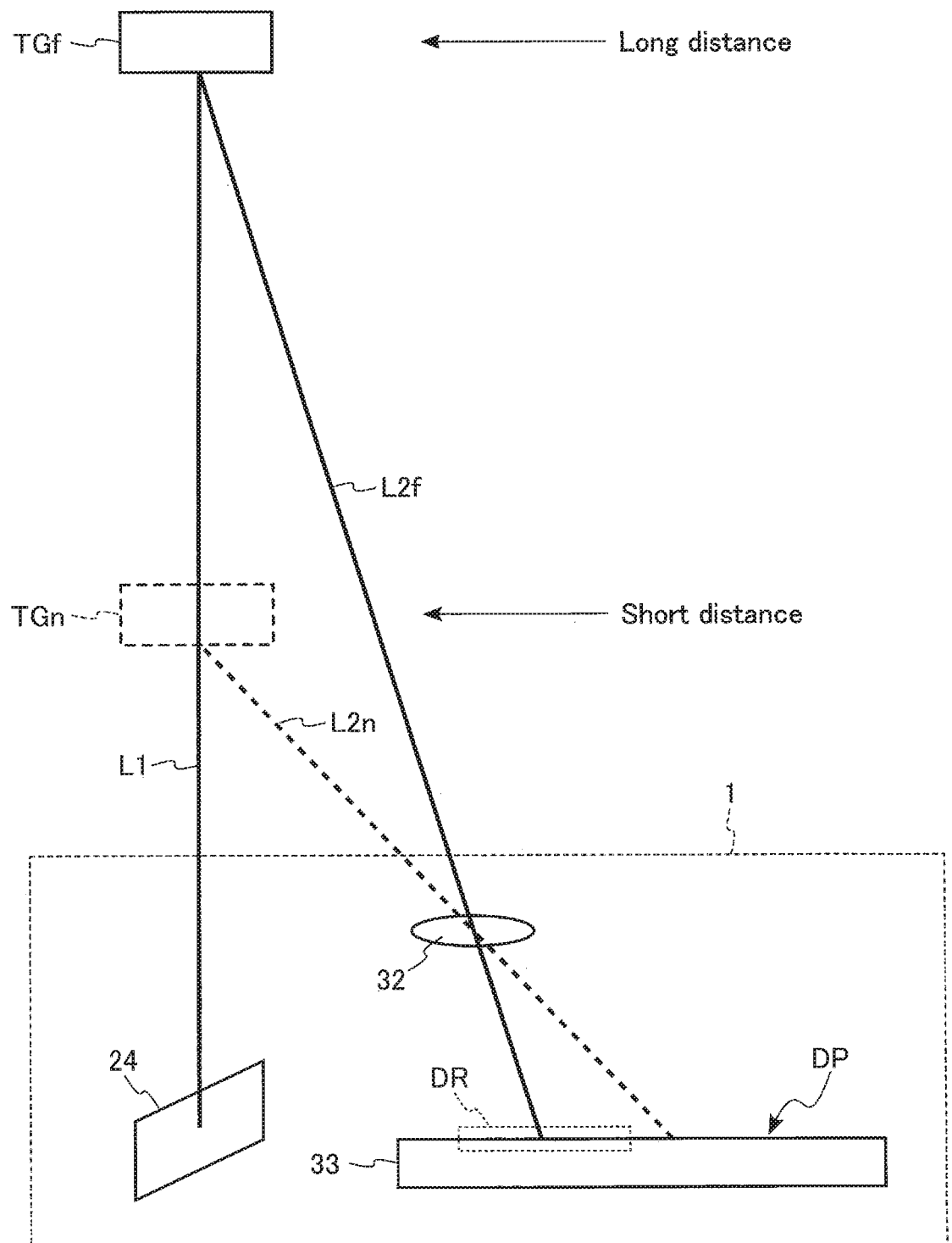
FIG. 10 depicts a schematic diagram showing an example of positional deviation of incident light in a distance measuring device of a non-coaxial optical system.

FIG. 10 depicts an example of parallax of reflected light in a distance measuring device of a non-coaxial optical system, showing the light source 15, lenses 21 and 32, and light detector 33 within the distance measuring device 1, and a long-distance target object TGf and a short-distance target object TGn.

As shown in FIG. 10, the laser light L1 emitted from the light source 15 is applied to the target object TGf or TGn through the mirror 24, and the laser light L2 (reflected light) reflected from the target object TGf or TGn is applied to the light detector 33 through the lens 32. Hereinafter, the laser light reflected from the long-distance target object TGf may be referred to as "L2$f$", and the laser light reflected from the short-distance target object TGn may be referred to as "L2$n$".

The light-receiving region DR of the light detector 33 is set, for example, to synchronize in accordance with the state of the mirror 24 and the position of the reflected light from the long-distance target object TGf. However, when the non-coaxial optical system is used, a parallax of the reflected light may be generated according to the distance between the distance measuring device 1 and the target object TG. Specifically, for example, the parallax of the reflected light when the distance between the distance measuring device 1 and the target object TG is within 5 meters may be about 0.1 millimeters. Such a parallax is generated in the direction away from the optical axis of the outgoing light. In addition, the parallax increases as the target object TG approaches.

Thus, there is a concern that the light-receiving region DR may not be able to receive the laser light L2$n$ reflected from the short-distance target object TGn even if it is able to receive the laser light L2$f$ reflected from the long-distance target object TGf. In contrast, the distance measuring device 1 according to the first embodiment sets a light-receiving region for short distance and a light-receiving region for long distance in the light-receiving region DR of the light detector 33 in the distance measurement operation.

[1-2-3] Setting of Light-Receiving Region DR Including Short-Distance Light-Receiving Region NDR FIG. 11 depicts an example of a setting method of the light-receiving region DR of the light detector 33 in the distance measurement operation of the distance measuring device 1 according to the first embodiment, showing outgoing light and an optical axis of the outgoing light of the distance measuring device 1, and the light receiver DP of the light detector 33. As shown in FIG. 11, when the coordinates "N" and "M" are designated, the light detector 33 according to the first embodiment sets the light-receiving region DR including a long-distance light-receiving region FDR and a short-distance light-receiving region NDR.

The long-distance light-receiving region FDR and the short-distance light-receiving region NDR are close to the optical axis of the outgoing light in this order. In other words, the short-distance light-receiving region NDR is set to a region far from the optical axis of the light-receiving system rather than the long-distance light-receiving region FDR. The width of the short-distance light-receiving region NDR in the second direction is preferably set to be greater than that of the long-distance light-receiving region FDR in the second direction. The long-distance light-receiving region FDR and the short-distance light-receiving region NDR may not necessarily be adjacent to each other.

The long-distance light-receiving region FDR is a region for detecting the reflected light (laser light L2$f$) mainly from the long-distance target object TGf. The arrangement of the pixels PX set to an ON state within the long-distance light-receiving region FDR is, for example, the same as that of the pixels PX described using FIG. 5. That is, in the long-distance light-receiving region FDR, a plurality of pixels PX set to an ON state are arranged, for example, two-dimensionally in a rectangular region.

The short-distance light-receiving region NDR is a region for detecting the reflected light (laser light L2$n$) mainly from the short-distance target object TGn. A plurality of pixels PX set to an ON state within the short-distance light-receiving region NDR are arranged, for example, one-dimensionally along the second direction on a side adjacent to the long-distance light-receiving region FDR and far from the optical axis of the outgoing light. As such, the short-distance light-receiving region NDR may include a pixel PX in an OFF state. In other words, the density of the ON-state pixels PX arranged may be set lower in the short-distance light-receiving region NDR than the long-distance light-receiving region FDR.

[1-2-4] Specific Example of Reflected Light in Distance Measurement Operation

Figure 12:
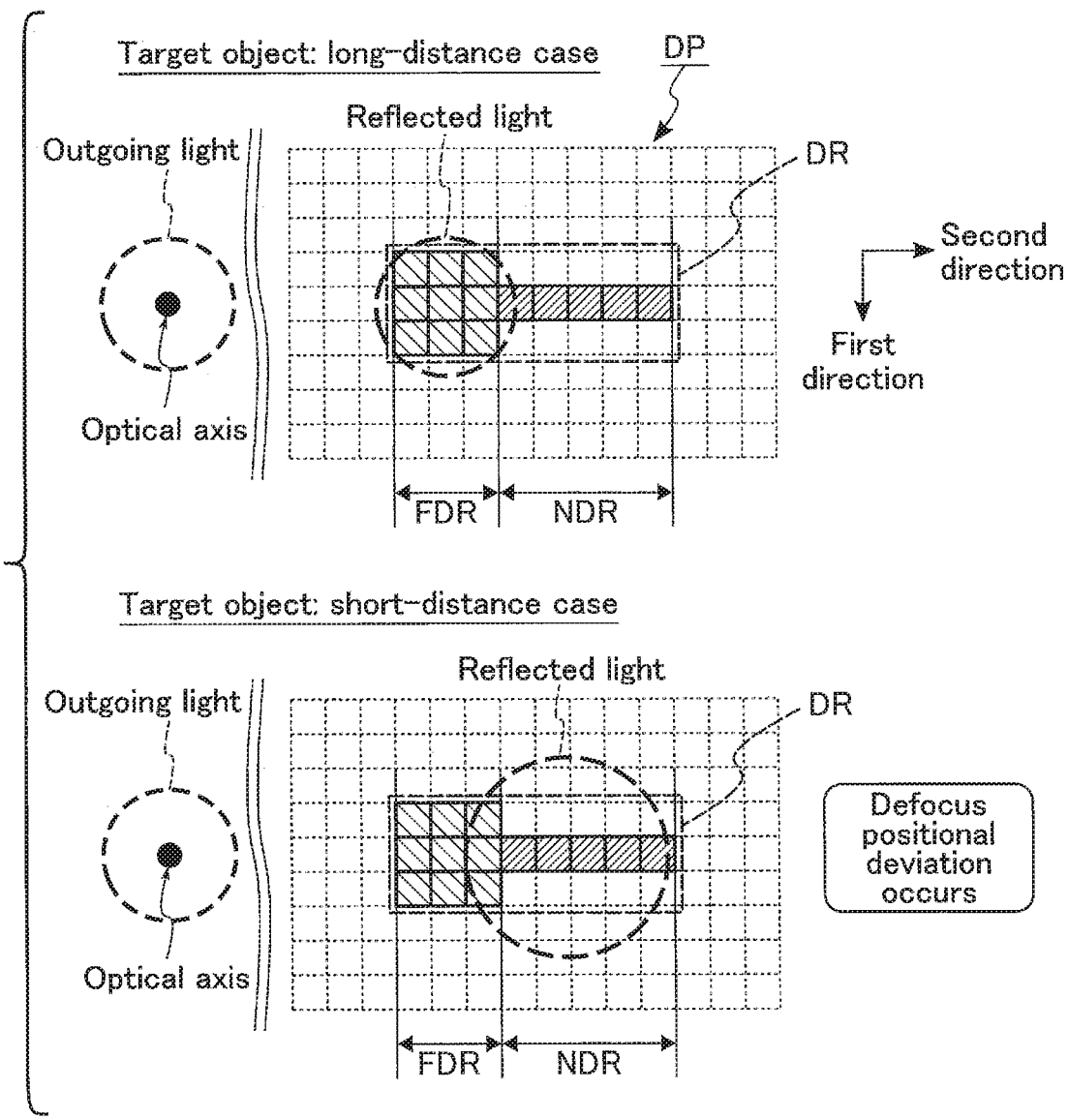
FIG. 12 depicts a plan view showing an example of a shape of incident light applied to the light detector in the distance measurement operation of the distance measuring device according to the first embodiment.

FIG. 12 depicts a specific example of reflected light applied to the light detector 33 in the distance measurement operation of the distance measuring device 1 according to the first embodiment, showing a light receiver DP similar to that shown in FIG. 11. In addition, the upper side of FIG. 12 corresponds to an example of the shape of the reflected light when the target object TG is located at a long distance, and the lower side of FIG. 12 corresponds to an example of the shape of the reflected light when the target object TG is located at a short distance.

As shown on the upper side of FIG. 12, the reflected light (laser light L2$f$) from the long-distance target object TGf is applied mainly within the long-distance light-receiving region FDR. On the other hand, as shown on the lower side of FIG. 12, the reflected light (laser light L2$n$) from the short-distance target object TGn is, for example, applied mainly within the short-distance light-receiving region NDR. As described with reference to FIG. 10, when the non-coaxial optical system is used, such deviation (parallax) of the irradiation position of the reflected light may occur.

In addition, a focal point of the optical system (e.g., the lens 32, etc.) on the light-receiving side of the distance measuring device 1 is, for example, infinity, i.e., set with the long-distance target object TGf as a reference. Thus, in the reflected light from the short-distance target object TGn, defocusing may be more likely to occur than in the reflected light from the long-distance target object TGf. The light intensity of the reflected light increases with decreasing distance from the target object TG, and decreases with increasing distance from the target object TG. In addition, the light intensity of the reflected light decreases as defocusing occurs.

[1-3] Effect of First Embodiment

LiDAR (Light Detection and Ranging) as a type of a distance measuring system irradiates an object to be measured with a laser, senses the intensity of reflected light reflected from the object to be measured by a sensor, and converts it into a time-series digital signal based on an output from the sensor. Then, a distance between the LiDAR and the object to be measured is calculated based on, for example, a time difference from the laser light emission to a peak of the sensed reflected light. Since measurement data of the LiDAR is expected to be used for, for example, control of a vehicle, high accuracy is required.

To manufacture the LiDAR at a low cost, the configuration is preferably as simple as possible. As a method for suppressing the cost, it is conceivable to suppress the cost of the optical system by a combination of a non-coaxial optical system and a 2D sensor. A 2D sensor synchronizes with scanning of the light emitter system, and changes the position of the light-receiving region. The synchronization accuracy of the light emitter system and light-receiving region can be loosened by the 2D sensor detecting light using a plurality of pixels, not one pixel. In addition, in the 2D sensor, influence due to deviation of the light-receiving position can be suppressed by providing a wide light-receiving region. On the other hand, providing a wide light-receiving region leads to an increase in power consumption. Since power consumption is preferably suppressed as much as possible, the light-receiving region is preferably set to the minimum range.

However, when the non-coaxial optical system is used, parallax occurs according to the position of an object to be measured. Thus, there is a concern that, when the light-receiving region is set according to a long-distance object to be measured, the 2D sensor may not be able to detect reflected light from a short-distance object to be measured. Defocusing occurs in reflected light from a short-distance object to be measured, but the magnitude of parallax is considered to be greater than expansion due to defocusing. Thus, when the object to be measured is at an extremely short distance, the reflected light may deviate from the light-receiving region even in consideration of the expansion due to defocusing.

Accordingly, the distance measuring device 1 according to the first embodiment sets the region FDR for receiving reflected light from a long distance and a region NDR for a short distance located on an opposite side of the light emitter system in the light receiver DP of the light detector 33. As a result, the distance measuring device 1 according to the first embodiment can set the light-receiving region DR corresponding to both a long-distance object and a short-distance object, and reduce pile-up in a sensor with respect to the short-distance object, thereby improving distance measurement accuracy.

Note that reflected light applied to the short-distance light-receiving region NDR is considered to be stronger than reflected light applied to the long-distance light-receiving region FDR, and to have expansion due to defocusing. In contrast, in the distance measuring device 1 according to the first embodiment, the density of the pixels PX in an ON state in the short-distance light-receiving region NDR can be reduced, rather than the light-receiving region DR simply being widened. In other words, the density of the pixels PX set to an ON state can be set lower in the long-distance light-receiving region FDR than in the short-distance light-receiving region NDR. Instead of reducing the density, the size of the short-distance light-receiving region NDR in the first direction may be set smaller than the size of the long-distance light-receiving region FDR in the first direction.

Thereby, even when the reflected light from the short-distance light-receiving region NDR has a deviation in the first direction, the distance measuring device 1 according to the first embodiment can detect the reflected light from the short-distance light-receiving region NDR. Accordingly, the distance measuring device 1 according to the first embodiment can suppress power consumption by reducing the pixels PX in an ON state within the short-distance light-receiving region NDR.

Note that as the distance between the target object TG and the distance measuring device 1 decreases, parallax increases, i.e., an angle at which outgoing light is reflected becomes large. Using this, the distance measuring device 1 according to the first embodiment may perform distance measurement by triangulation based on a light reception result in the short-distance light-receiving region NDR. For example, the distance measuring device 1 may perform distance measurement by triangulation based on the position of a pixel PX having the highest light intensity among light reception results of a plurality of pixels PX acquired in the short-distance light-receiving region NDR.

In addition, the distance measuring device 1 may perform both of distance measurement by the ToF method and distance measurement by triangulation. In this case, for example, the distance measuring device 1 performs the distance measurement by triangulation based on a light intensity distribution in the short-distance light-receiving region NDR, and performs the distance measurement by the ToF method based on a light intensity distribution in the long-distance light-receiving region FDR.

[2] Second Embodiment

A distance measuring device 1 according to a second embodiment has a configuration similar to that of the first embodiment, and turns off the pixels PX in the short-distance light-receiving region NDR according to an elapsed time from a pulse emission. In the following, points different from the first embodiment will be described regarding the distance measuring device 1 according to the second embodiment.

[2-1] Operation of Light Detector 33

Figure 13:
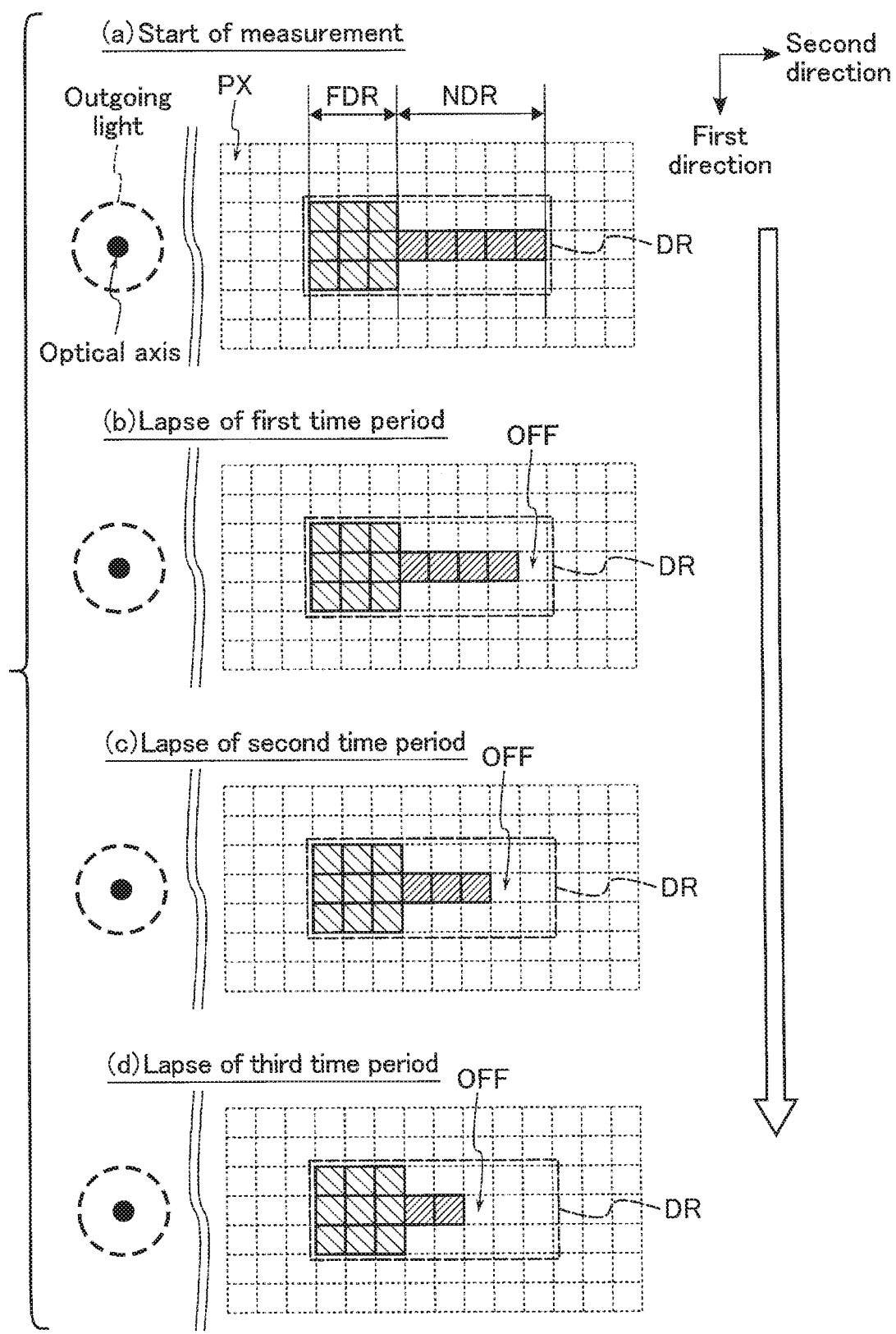
FIG. 13 depicts a plan view showing an example of a setting method of a light-receiving region of a light detector in a distance measurement operation of a distance measuring device according to a second embodiment.

FIG. 13 depicts an example of a setting method of the light-receiving region DR of the light detector 33 in a distance measurement operation of the distance measuring device 1 according to the second embodiment. FIGS. 13 (a) to (d) show that the time passes in this order from a start of measurement. That is, a first time period, a second time period, and a third time period show that a time elapsed from the start of measurement is longer in this order.

As shown in FIG. 13 (a), in the light detector 33 according to the second embodiment, at the start of measurement, for example, a light-receiving region DR similar to that shown in FIG. 8 is set. When the first time period passes from the start of measurement, as shown in FIG. 13 (b), one pixel PX farthest from the light emitter system, among the pixels PX in an ON state within the short-distance light-receiving region NDR, is turned off. When the second time period passes from the start of measurement, as shown in FIG. 13 (c), one pixel PX farthest from the light emitter system, among the pixels PX in an ON state within the short-distance light-receiving region NDR, is turned off. When the third time period passes from the start of measurement, as shown in FIG. 13 (d), one pixel PX farthest from the light emitter system, among the pixels PX in an ON state within the short-distance light-receiving region NDR, is turned off. Similarly thereafter, a pixel PX within the short-distance light-receiving region NDR is turned off as appropriate.

In the distance measurement operation of the distance measuring device 1 according to the second embodiment, it is preferable that the pixels PX within the short-distance light-receiving region NDR be turned off from a side far from the light emitter system. This is because a timing at which the reflected light reaches the light detector 33 becomes late as the distance from the target object TG increases, i.e., because a parallax of the reflected light becomes small as the time from the start of measurement becomes longer. For example, the controller 11 of the emission section 10 sets the pixels PX within the short-distance light-receiving region NDR to an OFF state when a time corresponding to the target object TG being present within 20 meters passes from the start of measurement. In the distance measuring device 1 according to the second embodiment, the pixels PX within the short-distance light-receiving region NDR may be at least turned off as appropriate according to the time elapsed. The other operations of the distance measuring device 1 according to the second embodiment are the same as those of the first embodiment.

[2-2] Effect of Second Embodiment

As described above, the distance measuring device 1 according to the second embodiment sets the pixels PX within the short-distance light-receiving region NDR to an OFF state according to the time elapsed. In other words, the distance measuring device 1 according to the second embodiment sets the pixels PX within the short-distance light-receiving region NDR to an ON state as appropriate for a period during which reflected light from a short-distance object may be received.

As a result, the distance measuring device 1 according to the second embodiment can shorten the time in which the SPAD is in an active state in the short-distance light-receiving region NDR, and thus can suppress power consumption of the light detector 33.

In the distance measuring device 1 according to the second embodiment, the density of the pixels PX set to an ON state within the short-distance light-receiving region NDR may be the same as that of the pixels PX set to an ON state within the long-distance light-receiving region FDR. Even in such a case, the distance measuring device 1 according to the second embodiment can suppress power consumption by controlling the pixels PX in the short-distance light-receiving region NDR to an OFF state as appropriate.

[3] Third Embodiment

A distance measuring device 1 according to a third embodiment has a configuration similar to that of the first embodiment, and relates to a method of outputting a plurality of output signals output from the light-receiving region DR. In the following, points different from the first embodiment will be described regarding the distance measuring device 1 according to the third embodiment.

[3-1] Operation of Light Detector 33

Figure 14:
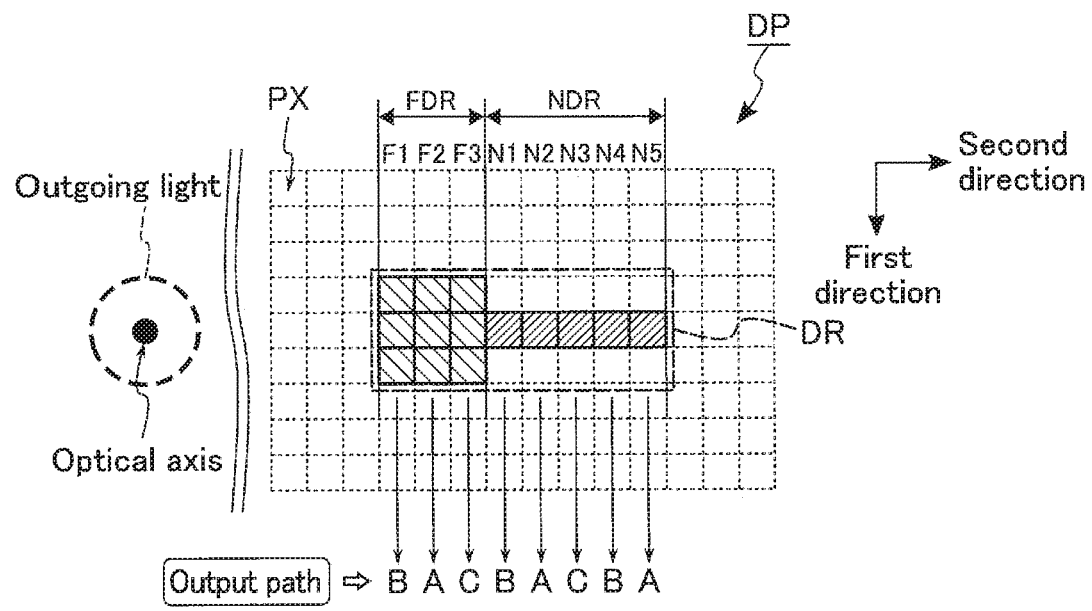
FIG. 14 depicts a plan view showing an example of an output path of a light intensity signal detected by a light detector in a distance measurement operation of a distance measuring device according to a third embodiment.

FIG. 14 depicts an example of an output path of a light intensity signal detected by the light detector 33 in a distance measurement operation of the distance measuring device 1 according to the third embodiment. As shown in FIG. 14, in the light detector 33 according to the third embodiment, for example, a light-receiving region DR similar to that of FIG. 11 is set.

Hereinafter, coordinates in the second direction included in the light-receiving region DR are referred to as "F1", "F2", "F3", "N1", "N2", "N3", "N4", and "N5" in order from the optical axis side of the outgoing light. The coordinates F1, F2, and F3 are included in the long-distance light-receiving region FDR. In this example, the coordinates N1, N2, N3, N4, and N5 are included in the short-distance light-receiving region NDR.

In addition, it is assumed that the light detector 33 according to the third embodiment uses three output paths "A", "B", and "C". A set of the output paths "A", "B", and "C" may be repeatedly arranged in the second direction. In other words, a plurality of pixels PX arranged for each three pixels in the second direction share part of the output paths. In this example, the coordinates N5, N2, and F2 share the output path "A". The coordinates N4, N1, and F1 share the output path "B". The coordinates N3 and F3 share the output path "C".

Then, in the light detector 33 according to the third embodiment, outputs of the pixels PX of the same output path included in the light-receiving region DR are wire-coupled to the same output path, and signals of the pixels PX in an ON state are output. Alternatively, the output signals IOUT may be output preferentially from a side far from the optical axis of the outgoing light. For example, first, the output signals IOUT of the coordinates N5, N4, and N3 within the short-distance light-receiving region NDR are output using the output paths "A", "B", and "C". Next, the output signals IOUT of the coordinates N2 and N1 within the short-distance light-receiving region NDR and the coordinate F3 within the long-distance light-receiving region FDR are output using the output paths "A", "B", and "C". Lastly, the output signals IOUT of the coordinates F2 and F1 within the long-distance light-receiving region FDR are output using the output paths "A" and "B".

Figure 15:
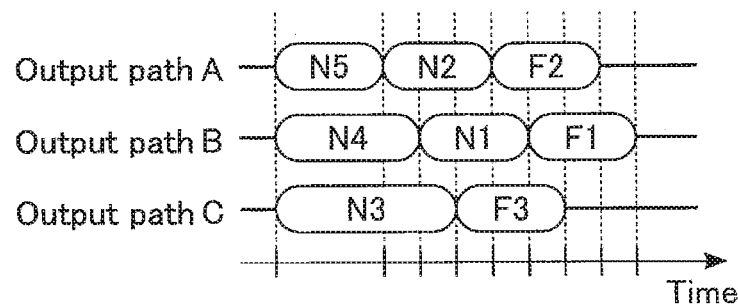
FIG. 15 depicts a timing chart showing an example of an output order of the light intensity signal detected by the light detector in the distance measurement operation of the distance measuring device according to the third embodiment.

FIG. 15 depicts another example of the order of outputting the light intensity signals detected by the light detector 33 in the distance measurement operation of the distance measuring device 1 according to the third embodiment. As shown in FIG. 15, there is a case where the order of inputting the output signals IOUT to the signal processor SP at a subsequent stage may be set for the output paths "A", "B", and "C". In this case, the output signals IOUT being transferred are buffered in the output paths "A", "B", and "C" as appropriate. Then, for example, the output signals IOUT are successively output according to a timing at which the signal processor SP is able to receive the signals.

In this example, first, the output signals IOUT of the coordinates N5, N4, and N3 transferred from the light-receiving region DR are buffered. Then, the buffered output signals are passed to the signal processor SP in the order of coordinates N5, N4, and N3. In the output paths that have output the buffered signals, the output signals IOUT to be transferred next are buffered continuously. In this example, after the output signals IOUT of the coordinates N5, N4, and N3 are output, the output signals IOUT of the coordinates N2, N1, and F3 are respectively buffered in the corresponding output paths. Similarly thereafter, the light detector 33 can transfer the optical signals acquired by the ON-state pixels PX to the signal processor SP. The other operations of the distance measuring device 1 according to the third embodiment are the same as those of the first embodiment.

Note that the above-described number and groups of output paths are only examples. According to the number of interconnects of the output paths provided in the light detector 33, grouping of the output paths can be appropriately changed. In addition, the pixels PX can also hold integrated values within a certain time, and output them in order. In this case, the light detector 33 is provided with a counter so as to easily obtain the integrated values within the light detector 33. By use of the output paths as appropriate, the light detector 33 can also hold values and output time division.

[3-2] Effect of Third Embodiment

As described above, in the light detector 33 according to the third embodiment, when outputting the light reception results of the plurality of pixels PX within the light-receiving region DR, the output paths are shared by the plurality of pixels PX. In other words, in the light detector 33 according to the third embodiment, allocation of the pixels PX and outputs is periodic.

Thereby, the number of outputs used for the output part of the light detector 33 can be reduced, and measurement circuits at a subsequent stage can be reduced. That is, in the light detector 33 according to the third embodiment, with reduction of the number of outputs, the area of the circuits used for the outputs can be reduced.

In addition, in the light detector 33 according to the third embodiment, the light reception results of the pixels PX are output from a side far from the light emitter system. As a result, in the distance measuring device 1 according to the third embodiment, the distance measurement processor 37 can process a light reception result regarding a distance from a target object TG that has approached, which is particularly important when the device is mounted on a vehicle, at an early point.

[4] Fourth Embodiment

A distance measuring device 1 according to a fourth embodiment has the same configuration as that of the first embodiment, and as shown in FIG. 8 or 9, pulsed light in a shape extending in the first direction is used in the distance measurement operation. In the following, points different from the first embodiment will be described regarding the distance measuring device 1 according to the fourth embodiment.

[4-1] Operation of Light Detector 33

FIG. 16 depicts an example of a setting method of the light-receiving region DR of the light detector 33 in the distance measurement operation of the distance measuring device 1 according to the fourth embodiment. As shown in FIG. 16, in the distance measuring device 1 according to the fourth embodiment, outgoing light has a shape extending in the first direction. The shape of the outgoing light in the fourth embodiment may have at least a portion extending in the first direction, and may have the shape of an ellipse, for example.

In addition, the light-receiving region DR in the fourth embodiment includes a plurality of channels CH1 to CH5. One channel CH corresponds to, for example, one measurement point for a target object TG, i.e., a pixel. The channels CH1 to CH5 are arranged in the first direction. That is, the distance measuring device 1 according to the fourth embodiment can obtain five measurement results arranged in the first direction for one pulsed light (outgoing light) in the distance measurement operation.

The light-receiving region set for each channel CH may have the same configuration as that of the light-receiving region DR described in the first embodiment. The light detector 33 according to the fourth embodiment can set the light-receiving region DR including the five channels CH arranged in the first direction by the coordinates "N" and "M" being designated. In the fourth embodiment, reflected light in the target object TG may be applied to each of the plurality of channels CH by using the outgoing light having the shape extending in the first direction. The other operations of the distance measuring device 1 according to the fourth embodiment are the same as those of the first embodiment.

[4-2] Effect of Fourth Embodiment

As described above, the distance measuring device 1 according to the fourth embodiment can obtain a plurality of measurement results at a time by using the vertically long pulsed light and providing the plurality of channels CH in the light-receiving region DR. That is, the distance measuring device 1 according to the fourth embodiment can improve the speed of performing scanning for one screen, and improve a frame rate of length measurement. In addition, in the distance measuring device 1 according to the fourth embodiment, by setting the short-distance light-receiving region NDR and the long-distance light-receiving region FDR in each channel CH, the same effect as that of the first embodiment can be obtained in each channel CH.

[5] Fifth Embodiment

A distance measuring device 1 according to a fifth embodiment has the same configuration as that of the fourth embodiment, and a plurality of short-distance light-receiving regions using mutually different pixel sizes are provided in a distance measurement operation. In the following, points different from the fourth embodiment will be described regarding the distance measuring device 1 according to the fifth embodiment.

[5-1] Operation of Light Detector 33

Figure 17:
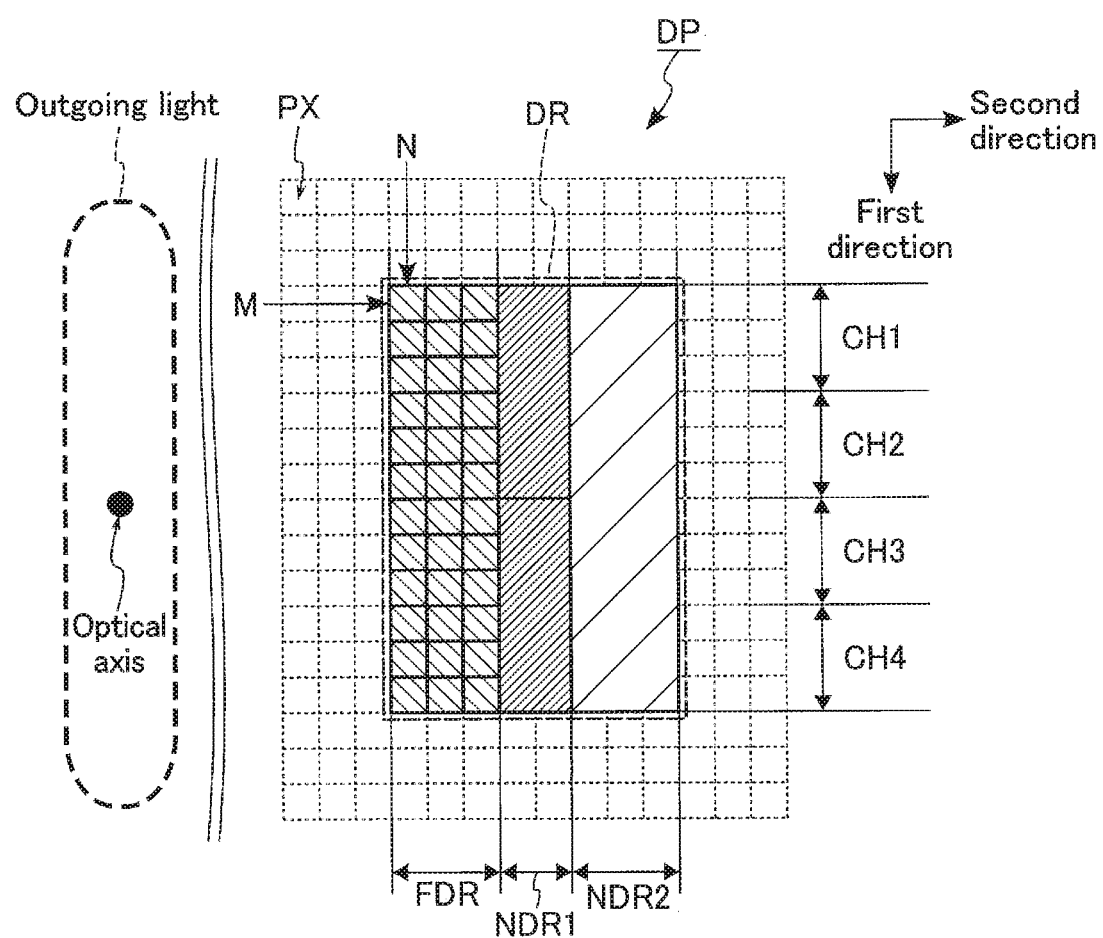
FIG. 17 depicts a plan view showing an example of a setting method of a light-receiving region of a light detector in a distance measurement operation of a distance measuring device according to a fifth embodiment.

FIG. 17 depicts an example of a setting method of the light-receiving region DR of the light detector 33 in the distance measurement operation of the distance measuring device 1 according to the fifth embodiment, and exemplifies a case where four channels CH are set in the light-receiving region DR. As shown in FIG. 17, the light detector 33 according to the fifth embodiment sets the light-receiving region DR including a long-distance light-receiving region FDR and a plurality of short-distance light-receiving regions NDR when the coordinates "N" and "M" are designated. In this example, as the plurality of short-distance light-receiving regions NDR, "NDR1" and NDR2" are set.

The long-distance light-receiving region FDR, short-distance light-receiving region NDR1, and short-distance light-receiving region NDR2 are close to the optical axis of the outgoing light in this order. In other words, the short-distance light-receiving region NDR1 is set in a region away from the optical axis of the light-receiving system rather than the long-distance light-receiving region FDR. The short-distance light-receiving region NDR2 is set in a region away from the optical axis of the light-receiving system rather than the short-distance light-receiving region NDR1. The width in the second direction of the short-distance light-receiving regions NDR1 and NDR2 in total is preferably set to be greater than that of the long-distance light-receiving region FDR.

The arrangement of a plurality of pixels PX in the long-distance light-receiving region FDR is the same as that of the fourth embodiment. Each of the short-distance light-receiving regions NDR1 and NDR2 uses a plurality of pixels PX collectively as one pixel. Then, the size of the pixel in the short-distance light-receiving region NDR1 is larger than that of the pixel PX in the long-distance light-receiving region FDR. In other words, the number of the pixels PX included in the pixel set in the short-distance light-receiving region NDR1 is greater than that of the pixels PX included in the pixel set in the long-distance light-receiving region FDR. For example, the width of the pixel in the first direction in the short-distance light-receiving region NDR1 is the same as that of two channels CH.

The size of the pixel in the short-distance light-receiving region NDR2 is larger than that of the pixel PX in the short-distance light-receiving region NDR1. In other words, the number of the pixels PX included in the pixel set in the short-distance light-receiving region NDR2 is greater than that of the pixels PX included in the pixel set in the short-distance light-receiving region NDR1. For example, the width of the pixel PX in the first direction in the short-distance light-receiving region NDR2 is the same as that of the four channels CH.

The distance measuring device 1 according to the fifth embodiment can obtain, when each of the outgoing lights corresponding to the channels CH1 to CH4 is applied to the long-distance target object TG, four measurement results arranged in the first direction for one outgoing light. On the other hand, in the distance measuring device 1 according to the fifth embodiment, as compared with the long-distance light-receiving region FDR, for example, the short-distance light-receiving region NDR1 has a ½ resolution, and the short-distance light-receiving region NDR2 has a ¼ resolution.

Note that the size of the pixel in each short-distance light-receiving region NDR is not limited thereto. In the fifth embodiment, the size of the pixel included in the short-distance light-receiving region NDR may be at least set to increase with increasing distance from the optical axis of the outgoing light. Three types or more short-distance light-receiving regions NDR may be set. The other operations of the distance measuring device 1 according to the fifth embodiment are the same as those of the fourth embodiment.

[5-2] Effect of Fifth Embodiment

As described above, the distance measuring device 1 according to the fifth embodiment includes, in the short-distance light-receiving region NDR, the pixels larger in size than those of the long-distance light-receiving region FDR. Thereby, the light detector 33 can output the light reception results of the pixels within the short-distance light-receiving region NDR collectively, thus facilitating the handling of the output signals.

In addition, since the size of the pixel is large in the short-distance light-receiving region NDR, the number of SPADs used for light reception becomes large. That is, a dynamic range of the pixel within the short-distance light-receiving region NDR may be expanded. As a result, in the light detector 33 according to the fifth embodiment, a TDC (Time-to-Digital Converter), which is generally weak to pile-up and requires a large dynamic range, can be used for the light reception results in the short-distance light-receiving region NDR. Since the time resolution of the TDC is higher than that of an ADC, the light detector 33 can further improve the detection accuracy of the short-distance target object TG.

Furthermore, it is effective to combine the fifth embodiment with the second embodiment. That is, the distance measuring device 1, for example, turns off the pixels within the short-distance light-receiving region NDR from a side far from the optical axis of the outgoing light when a predetermined time passes after emitting laser light. Thereby, the distance measuring device 1 according to the fifth embodiment can suppress power consumption of the light detector 33 in the same manner as the second embodiment.

[6] Others

The above-described embodiments can be combined. For example, the second embodiment can be combined with any one of the third to fifth embodiments. The third embodiment can be combined with any one of the fourth and fifth embodiments. Furthermore, three or more embodiments may be combined together. The distance measuring device 1 in which a plurality of embodiments are combined can obtain the effect of each of the combined embodiments.

In the present specification, the width of each of the "short-distance light-receiving region NDR" and "long-distance light-receiving region FDR" is calculated based on, for example, the width of a region provided with a pixel PX in an ON state in the distance measurement operation. When measuring a plurality of channels CH collectively, "the width of a region in the first direction" may be calculated for each channel CH. For example, "an output signal of one pixel PX" corresponds to a total of light detection results by SPADs included in the pixel PX. That is, the size of the pixel PX is defined by, for example, the number and arrangement of SPADs associated with signals collectively output from the light receiver DP. "A quench element" corresponds to, for example, a quench resistor, or a transistor.

In the present specification, a level "H" voltage is a voltage in which an N-type transistor enters an ON state when said voltage is applied to its gate, and a P-type transistor enters an OFF state when said voltage is applied to its gate. A level "L" voltage is a voltage in which an N-type transistor enters an OFF state when said voltage is applied to its gate, and a P-type transistor enters an ON state when said voltage is applied to its gate.

In the present specification, the term "couple/connect" refers to electrical coupling, and does not exclude intervention of, for example, another element. In the present specification, "an ON state" refers to a state in which the gate of a relevant transistor has a voltage equal to or greater than the threshold voltage of the transistor applied. "An OFF state" refers to a state in which the gate of a relevant transistor has a voltage below the threshold voltage of the transistor applied, and does not exclude the state where a subtle electric current such as a leakage current in the transistor flows.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A light detector comprising:
   a light receiver including a plurality of sensors and a plurality of pixels, the sensors arranged two-dimensionally on a substrate, and each of the pixels including at least one of the sensors; and
   a controller configured to:
   set an overall light-receiving region in which the sensors are selectively turned on in the light receiver;
   set a first light-receiving region of the overall light-receiving region and a second light-receiving region of the overall light-receiving region different from the first light-receiving region, based on coordinate information input from outside the light receiver, wherein the first light-receiving region includes first pixels included in the plurality of pixels, the second light-receiving region includes second pixels included in the plurality of pixels, and the second light-receiving region is arranged to be further away from an optical axis of laser light received by the light receiver than the first light-receiving region;
   turn on one more of the first pixels and one or more of the second pixels during a first period; and
   turn off a second pixel of the one or more of the second pixels during a second period after the first period, in a state in which the one or more of the first pixels are on, wherein a density in the second light-receiving region of the one or more of the second pixels in an on-state is less than a density in the first light-receiving region of the one or more of the first pixels in an on-state.

2. The light detector of claim 1, wherein
   a total number of the one or more of the second pixels is less than a total number of the one or more of the first pixels.

3. The light detector of claim 1, wherein
   in the second light-receiving region, a plurality of the second pixels are arranged in a first direction in which the first light-receiving region and the second light-receiving region are adjacent to each other, and
   the controller, after turning on each of the one or more of the first pixels and the one or more of the second pixels, is further configured to turn off second pixels of the one or more of the second pixels in order startinq from a side of the second light-receiving region that is furthest from the first light-receiving region, in a state in which the one or more of the first pixels are on.

4. The light detector of claim 1, wherein
   in the second light-receiving region, a plurality of the second pixels are arranged in a first direction in which the first light-receiving region and the second light-receiving region are adjacent to each other, and
   the controller is further configured to cause the one or more of the second pixels to output detected optical signals in order startinq from a side of the second light-receiving region that is furthest from the first light-receiving region.

5. The light detector of claim 1, wherein
   each of the sensors includes an avalanche photodiode and a quench element, an anode of the avalanche photodiode coupled to a first power supply node, an end of the quench element coupled to a second power supply node, and another end of the quench element coupled to a cathode of the avalanche photodiode, and
   the controller, when a sensor of the sensors is turned on, is further configured to apply a first voltage to the first power supply node and apply a second voltage higher than the first voltage to the second power supply node.

6. The light detector of claim 1, wherein
   a total number of the one or more of the second pixels is equal to a total number of the one or more of the first pixels.

7. A light detector comprising:
   a light receiver including a plurality of sensors arranged two-dimensionally on a substrate; and
   a controller configured to:
   set an overall light-receiving region in which the sensors are selectively turned on in the light receiver; and
   set a first light-receiving region of the overall light-receiving region and a second light-receiving region of the overall light-receiving region different from the first light-receiving region, based on coordinate information input from outside the light receiver,
   wherein the second light-receiving region is arranged to be further away from an optical axis of laser light received by the light receiver than the first light-receiving region,
   wherein the width of the second light-receiving region in a first direction in which the first light-receiving region and the second light-receiving region are adjacent to each other, is greater than the width of the first light-receiving region in the first direction, and
   wherein the width of a portion of the second light-receiving region in a second direction intersecting the first direction is narrower than the width of the first light-receiving region in the second direction, the portion of the second light-receiving region being turned on.

8. The light detector of claim 7, wherein
   the light receiver includes a plurality of pixels, each of the plurality of pixels including at least one of the sensors,
   the controller is further configured to set a third light-receiving region based on the coordinate information,
   the second light-receiving region is arranged to be between the first light-receiving region and the third light-receiving region,
   the first light-receiving region includes first pixels included in the plurality of pixels,
   the second light-receiving region includes second pixels included in the plurality of pixels,
   the third light-receiving region includes at least one third pixel included in the plurality of pixels, and
   a total number of the second pixels is less than a total number of the first pixels, and a total number of the at least one third pixel is less than the total number of the second pixels.

9. The light detector of claim 7, wherein
   the light receiver includes a plurality of pixels, each of the plurality of pixels including at least one of the sensors,
   the first light-receiving region includes first pixels included in the plurality of pixels,
   the second light-receiving region includes second pixels included in the plurality of pixels, and
   the controller is further configured to cause a plurality of the second pixels to output detected optical signals in order startinq from a side of the second light-receiving region that is furthest from the first light-receiving region.

10. The light detector of claim 7, wherein
    each of the sensors includes an avalanche photodiode and a quench element, an anode of the avalanche photodiode coupled to a first power supply node, an end of the quench element coupled to a second power supply node, and another end of the quench element coupled to a cathode of the avalanche photodiode, and the controller, when a sensor of the sensors is turned on, is further configured to apply a first voltage to the first power supply node and apply a second voltage higher than the first voltage to the second power supply node.

11. A distance measuring device comprising:

a light emitter configured to emit an optical signal, a light receiver configured to receive reflected light of the optical signal emitted by the light emitter, the light receiver including a plurality of sensors and a plurality of pixels, the sensors arranged two-dimensionally on a substrate, and each of the plurality of pixels including at least one of the sensors; and a controller configured to:
set an overall light-receiving region in which the sensors are selectively turned on in the light receiver;
set a first light-receiving region of the overall light-receiving region and a second light-receiving region of the overall light-receiving region different from the first light-receiving region, based on coordinate information input from outside the light receiver, wherein the first light-receiving region includes first pixels included in the plurality of pixels, the second light-receiving region includes second pixels included in the plurality of pixels, and the second light-receiving region is arranged to be further away from an optical axis of the optical signal emitted by the light emitter than the first light-receiving region;
turn on one or more of the first pixels and one or more of the second pixels during a first period; and
turn off a second pixel of the one or more of the second pixels during a second period after the first period, in a state in which the one or more of the first pixels are on, wherein a density in the second light-receiving region of the one or more of the second pixels in an on-state is less than a density in the first light-receiving region of the one or more of the first pixels in an on-state.

12. The distance measuring device of claim 11, wherein the first light-receiving region includes first and second channels arranged in a second direction, the second direction intersecting a first direction in which the first light-receiving region and the second light-receiving region are adjacent to each other, and the controller is further configured to measure a first distance and a second distance, which are each between a target object and the distance measuring device, based on the optical signal emitted by the light emitter and a light reception result of the reflected light received by the light receiver, the first distance and the second distance corresponding to the first channel and the second channel, respectively.

13. The distance measuring device of claim 12, wherein the first channel includes a first pixel of the first pixels, and the second channel includes another first pixel of the first pixels, a total number of the one or more of the second pixels is less than a total number of the one or more of the first pixels, and the second light-receiving region is adjacent to each of the first channel and the second channel in the first direction.

14. The distance measuring device of claim 11, wherein the controller is further configured to set a third light-receiving region based on the coordinate information, the second light-receiving region is arranged to be between the first light-receiving region and the third light-receiving region, the third light-receiving region includes at least one third pixel included in the plurality of pixels, and a total number of the one or more of the second pixels is less than a total number of the one or more of the first pixels, and a total number of the at least one third pixel is less than the total number of the one or more of the second pixels.

15. The distance measuring device of claim 14, wherein the controller is further configured to:

after turning on the one or more of the first pixels and the one or more of the second pixels, turn off the at least one third pixel in a state in which the one or more of the first pixels and the one or more of the second pixels are on; and after turning off the third pixel, turn off the second pixel of the one or more of the second pixels in a state in which the one or more of the first pixels are on.

16. The distance measuring device of claim 11, wherein the controller is further configured to measure a distance between a target object receiving the optical signal emitted by the light emitter and the distance measuring device based on a timing at which the light emitter emits the optical signal and a timing at which the light receiver receives the reflected light.

17. The distance measuring device of claim 11, wherein the controller, when the light receiver receives the reflected light in the second light-receiving region, is further configured to measure a distance between a target object receiving the optical signal and the distance measuring device based on a position of a second pixel of the one or more of the second pixels, detecting the reflected light.

18. The distance measuring device of claim 11, wherein each of the sensors includes an avalanche photodiode and a quench element, an anode of the avalanche photodiode coupled to a first power supply node, an end of the quench element coupled to a second power supply node, and another end of the quench element coupled to a cathode of the avalanche photodiode, and the controller, when a sensor of the sensors is turned on, is further configured to apply a first voltage to the first power supply node and apply a second voltage higher than the first voltage to the second power supply node.

19. The distance measuring device of claim 11, wherein a total number of the one or more of the second pixels is equal to a total number of the one or more of the first pixels.

* * * * *